(12) United States Patent
Slott et al.

(10) Patent No.: US 7,046,250 B1
(45) Date of Patent: May 16, 2006

(54) CACHING FONTS FOR IMPROVED BANDWIDTH OF TRANSMITTED TEXT

(75) Inventors: Jordan M. Slott, Sunnyvale, CA (US); Thomas G. O'Neill, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/623,058

(22) Filed: Jul. 17, 2003

Related U.S. Application Data

(63) Continuation-in-part of application No. 10/449,540, filed on May 29, 2003, which is a continuation-in-part of application No. 10/247,907, filed on Sep. 20, 2002, which is a continuation-in-part of application No. 10/194,123, filed on Jul. 11, 2002.

(51) Int. Cl.
*G06T 9/00* (2006.01)
*G06T 1/60* (2006.01)

(52) U.S. Cl. .................. 345/555; 345/557; 345/530
(58) Field of Classification Search ............. 345/555, 345/557, 530, 543, 553, 531, 545; 382/232
See application file for complete search history.

(56) References Cited

U.S. PATENT DOCUMENTS

| | | | | |
|---|---|---|---|---|
| 4,555,775 A | 11/1985 | Pike | ................. | 364/900 |
| 5,020,003 A | 5/1991 | Moshenberg | ........... | 364/518 |
| 5,179,651 A * | 1/1993 | Taaffe et al. | ............ | 345/555 |
| 5,212,770 A * | 5/1993 | Smith et al. | ............ | 715/746 |
| 5,241,625 A * | 8/1993 | Epard et al. | ............ | 345/502 |
| 5,392,391 A | 2/1995 | Caulk, Jr. et al. | ............ | 395/162 |
| 5,440,686 A | 8/1995 | Dahman et al. | ............ | 395/164 |
| 5,603,034 A | 2/1997 | Swanson | ............ | 395/701 |
| 5,757,386 A * | 5/1998 | Celi et al. | ............ | 345/548 |
| 5,883,640 A | 3/1999 | Hsieh et al. | ............ | 345/503 |
| 5,917,504 A | 6/1999 | Yutaka et al. | ............ | 345/509 |
| 5,936,616 A * | 8/1999 | Torborg et al. | ............ | 345/555 |
| 5,986,661 A | 11/1999 | Hemingway | ............ | 345/421 |
| 6,006,013 A | 12/1999 | Rumph et al. | ............ | 395/114 |
| 6,031,550 A | 2/2000 | Larson | ............ | 345/511 |

(Continued)

OTHER PUBLICATIONS

Howe, D., "least recently used", *The Free Online Dictionary of Computing*, p. 1 [Online], Feb. 15, 1995. Retrieved from the Internet on Jun. 7, 2005. Retrieved from the Internet: <URL:http://burks.brighton.ac.uk/burks/foldoc/72/65.htm>.

(Continued)

*Primary Examiner*—Kee M. Tung
*Assistant Examiner*—Joni Hsu
(74) *Attorney, Agent, or Firm*—Gunnison, McKay & Hodgson, L.L.P.; Philip J. McKay

(57) ABSTRACT

Caching fonts on a display computer may be performed in order to reduce network bandwidth utilization and/or to improve CPU usage. Text commands may be recorded when they are executed to create a portion of a graphics image. These text commands may be used to update a data structure with information, and this data structure may be used to more efficiently transmit the text portions of the graphics image. A caching mechanism may be used wherein the font utilized by the text command is stored in the cache if a compatible font does not already exist in the cache. Once the font has been cached, subsequent text commands utilizing the font may be executed with a dramatic reduction in network bandwidth.

6 Claims, 22 Drawing Sheets

U.S. PATENT DOCUMENTS

| | | | | |
|---|---|---|---|---|
| 6,049,330 | A | 4/2000 | Redford | 345/202 |
| 6,064,771 | A | 5/2000 | Migdal et al. | 382/232 |
| 6,097,388 | A | 8/2000 | Goodfellow | 345/344 |
| 6,300,953 | B1 | 10/2001 | Rivard et al. | 345/430 |
| 6,304,928 | B1 | 10/2001 | Mairs et al. | 710/68 |
| 6,366,289 | B1 * | 4/2002 | Johns | 345/543 |
| 6,633,299 | B1 | 10/2003 | Sreenivas et al. | 345/557 |
| 6,721,852 | B1 | 4/2004 | Shanahan et al. | 711/133 |
| 6,751,356 | B1 | 6/2004 | Oki | 382/240 |
| 2002/0021455 | A1 | 2/2002 | Ishii et al. | 358/1.15 |
| 2002/0035596 | A1 | 3/2002 | Yang et al. | 709/203 |
| 2002/0093506 | A1 | 7/2002 | Honson | 345/553 |
| 2002/0180757 | A1 | 12/2002 | Duerr et al. | 345/620 |
| 2003/0028728 | A1 | 2/2003 | Ito | 711/118 |
| 2003/0191859 | A1 | 10/2003 | Ramsey | 709/247 |
| 2004/0002327 | A1 | 1/2004 | Tanaka | 455/418 |
| 2004/0010543 | A1 | 1/2004 | Grobman | 709/203 |
| 2004/0059877 | A1 | 3/2004 | Brown et al. | 711/144 |

OTHER PUBLICATIONS

Wales, J., "Hash Table", *Wikipedia, The Free Encyclopedia*, pp. 1-6 [Online]. Retrieved from the Internet on Nov. 30, 2004. Retrieved from the Internet: <URL:http://en.wikipedia.org/wiki/Hash_table>.

"Width vs. Pitch", *DirectX 9.0 C++*, p. 1 [Online]. Retrieved from the Internet on Apr. 11, 2005. Retrieved from the Internet: <URL:http://msdn.microsoft.com/library/en-us/directx9_{13} c/directx/graphics/Programming Guide/GettingStarted/Direct3Dsurfaces/widthvspitch.asp>. No author provided.

* cited by examiner

CACHING FONTS FOR IMPROVED BANDWIDTH OF TRANSMITTED TEXT

CROSS-REFERENCE TO RELATED APPLICATION

The present application is a continuation-in-part of application Ser. No. 10/449,540, filed May 29, 2003, by Jordan M. Slott and Thomas G. O'Neill, entitled "CACHING BACKING-STORE IMAGES TO REDUCE BANDWIDTH", and of application Ser. No. 10/247,907, filed Sep. 20, 2002, by Thomas G. O'Neill and Jordan M. Slott, entitled "TAGGING SINGLE-COLOR IMAGES FOR IMPROVED COMPRESSION", which was a continuation-in-part of co-pending application Ser. No. 10/194,123, filed Jul. 11, 2002, by Thomas G. O'Neill and Jordan M. Slott, entitled "TAGGING MULTICOLOR IMAGES FOR IMPROVED COMPRESSION".

FIELD OF THE INVENTION

The present invention relates to the field of computer graphics. More particularly, the present invention relates to the caching of fonts in order to improve bandwidth of transmitted text and/or to reduce CPU usage. The present invention also relates to the identification and tagging of text regions in composite images in order to improve bandwidth of transmitted text and reduce CPU usage.

BACKGROUND OF THE INVENTION

Remote computing applications where screen information is generated on one computer (a "host") and transmitted for display on another computer ("a display") are growing in popularity. Examples of some display computers include multipurpose PCs, thin-clients, and Personal Digital Assistants (PDAs).

The X Windows System is a standard that utilizes X client software and X server software to enable the updating of displays at the requests of X client applications. The X server software runs on the host computer. An X client application, which may be running on a different computer, communicates with the X server software by utilizing a low-level library of routines known as Xlib. Xlib provides the functions required to connect to display servers, create windows, render graphics, respond to events, etc. The X server software then may interface with display drivers to actually render the graphics on the display.

X is frequently used as a "local display application", where the X-server and display are both on the same computer. That is, the same computer is both the "host" and "display" computer. Examples of this usage include running an X-server on a workstation or on an X-terminal. An X-terminal typically has a computer processor, graphics subsystem and display, but no hard drive. Applications running on other computers use the Xlib routines to communicate with the X-server software running on the X-terminal.

While in some contexts it is advantageous to have the X server and the display on the same computer, this is not necessarily the case in other contexts. One specific context that will be discussed is a remote display application. In such a design, client applications make requests of a centralized server or servers (here known collectively as the "host computer"). The host computer then manages one or more "display computers", which are typically simple terminal devices.

The Sun Ray™ appliance from Sun Microsystems, Inc. of Palo Alto, Calif. is an example of a thin client which serves as a "display computer" in a remote computing application. A Sun Ray™ appliance has a processor, graphics subsystem and display, but no hard drive. A Sun Ray™ appliance is a "display" computer and runs its own proprietary software. The Sun Ray™ server is the "host" computer and runs the X-server software. The full screen image is maintained both in RAM on the host computer as well as in the frame buffer of the Sun Ray™ appliance's video card. In order to synchronize the displays, the host computer sends screen update information to the Sun Ray™ appliance via a network protocol known as NewT. The Sun Ray™ appliance uses the protocol commands to update the state of its hardware frame buffer.

In remote display applications, an increased burden is placed on the network as more information is transmitted from the host computer to the display computers. It is desirable to reduce the network bandwidth used by remote computing applications. Doing so provides shorter transmission times between the host and display computers, reduced load on the network (and resulting improvement in network performance), and the capability to utilize more devices on a single network.

For many typical computing functions such as web browsing, the network bandwidth between the host computer and the display computer that is required to transmit the screen information corresponding to textual characters can be significant. Furthermore, the network bandwidth required to transmit the screen information for textual characters can impact the perceived responsiveness and usability of the remote display computer for applications which normally run quickly on PCs (personal computers or "fat" clients).

What is needed is a solution for reducing the bandwidth utilized in the transmission of screen information corresponding to textual characters. Such a solution may also reduce the CPU usage on host and/or display computer.

BRIEF DESCRIPTION

Caching fonts on a display computer may be performed in order to reduce network bandwidth utilization and/or to improve CPU usage. Text commands may be recorded when they are executed to create a portion of a graphics image. These text commands may be used to update a data structure with information, and this data structure may be used to more efficiently transmit the text portions of the graphics image. A caching mechanism may be used wherein the font utilized by the text command is stored in the cache if a compatible font does not already exist in the cache. Once the font has been cached, subsequent text commands utilizing the font may be executed with a dramatic reduction in network bandwidth.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
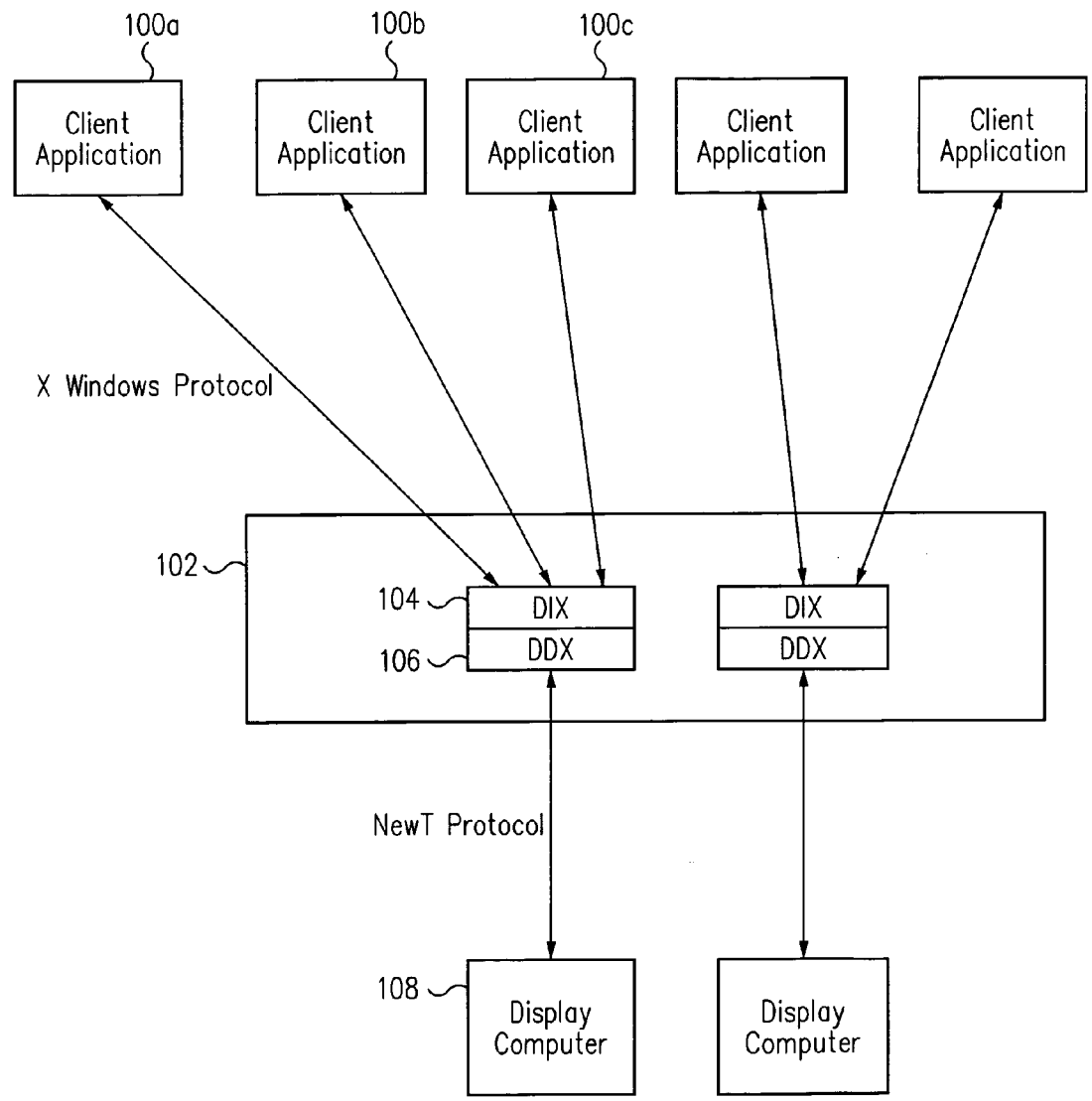
FIG. 1 is a block diagram illustrating a remote display application such as a Sun Ray™ network.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention provides a mechanism to cache fonts. The present invention also provides a mechanism to identify and tag text regions in a composite image. As will be seen, this results in the ability to dramatically reduce network bandwidth utilization and improve CPU usage on the host and/or display computers.

One embodiment of the present invention may be built into the context of an X Windows System. However, one of ordinary skill in the art will recognize that it may be adapted to any windowing system.

In remote display applications based on an X server, the Device Dependent X (DDX) layer of the X server may be modified to include possible compression of the screen data and transmission of remote display protocol commands to the display computer. The DDX provides a software interface to a conceptual hardware device. In a specific embodiment of the present invention, the desired results can be accomplished by modifying the DDX, without changing the DIX.

FIG. 1 is a block diagram illustrating a remote display application such as a Sun Ray™ network. Client applications 100a–100c send information to and receive information from the host computer 102 over the X Windows Protocol. Some of the information comprises text commands, which draw text to regions. The host computer utilizes a device independent layer (DIX) 104 to act as a controlling layer, which handles initialization procedures and all device-independent handling of requests and events. A device dependent layer (DDX) 106 then is used to handle device dependent functionality. The DDX 106 then communicates with display computer 108 using the NewT protocol. The DIX and the DDX essentially make up an X-server.

The Sun Ray™ host typically transmits textual information as glyphs. Each pixel in the text is represented by a single bit in the glyph. A "1" in the glyph tells the Sun Ray™ to draw the foreground color for the corresponding pixel, while a "0" tells the Sun Ray™ to either leave the pixel transparent or to draw the background color. Naturally, the foreground and background colors are transmitted to the Sun Ray™ as part of the "glyph" command.

The bandwidth required to transmit textual information as a glyph is ceiling (width/8)* height, where "width" is the width of the font in pixels, "height" is the height of the font in pixels, and the ceiling function rounds up to the nearest integer. The (width/8) quantity may be rounded up to the nearest integer to reflect the fact that each scan line in the glyph encoding is aligned along byte boundaries. While such an alignment is not strictly necessary, it is a common technique used to simplify the underlying software. For example, even a relatively small font where each character is 8 pixels wide and 10 pixels tall takes 10 bytes to encode as a glyph (for simplicity, this assumes that each character in the font has the same dimensions). Therefore, a screen-full of text 80 columns wide by 30 lines tall is represented by 24,000 bytes (192,000 bits) as glyphs. This computation ignores the overhead of the "glyph" command to the remote display which must include, at the very least, the (x, y) coordinate position of the text on the screen, the foreground color, and optionally, the background color. A simple page of text, therefore, can take at least a significant fraction of a second to transmit to the display computer under low-bandwidth conditions. This transmission time is noticeable to the user.

In an embodiment of the present invention, font information may be dynamically cached on the display computer to reduce the overall bandwidth required to transmit textual information and improve the interactive performance of the user experience. The font information may be transmitted to the display computer in its entirety when the first character of the font needs to be displayed by the host computer. The font information may be defined as the glyph representation for each character as well as each characters "metrics", a set of measurements for a character which is necessary when displaying, the metrics computing exactly where to display the character on a screen relative to an (x, y) coordinate.

While in the above embodiment the entire font is cached at once, one of ordinary skill in the art will recognize that this need not be the case. Each character could be cached only when it is first used itself and not when the first character of the font is used. In this variation, the host computer may store which characters of a font it has cached, and the display computer's cache may contain the font information for only those characters. In this embodiment, bandwidth usage is saved by only transmitting those previously-unseen characters which are actually present in the text strings of text commands. This may be significant for larger fonts, the up-front transmission time of which may be significant and noticeable to the user. In some cases, cashing an entire font may not be possible if the font contains an exceptionally large number of character images. For example, in UNICODE, each text character is represented by 16-bits in the text string. It is not possible to cache all 65,536 character images in the font. It also saves transmission time for those characters which are never used. Additionally, in another variation, the most-often used characters (such as letters, numbers, and primary punctuation marks) may be stored in the cache the first time the font is used, with other characters being stored individually as they are used. For simplicity, the remainder of the application will focus on the case where the entire font is cached at once.

The font information may be cached on the display computer until the host computer replaces it with another font. Once the font information has been transmitted and cached, all textual information in that font may be transmitted to the display computer as "text" commands rather than "glyph" commands. Text commands may encode a string of text characters using one byte per character, for example, using the ASCII encoding format. However, one of ordinary skill in the art will recognize that the invention could also be modified to utilize text encodings of more than one-byte-per-character, such as UNICODE. Furthermore, the text strings may be further compressed using an entropy encoding scheme, such as LZ-77 or Huffman encoding to further reduce their bandwidth.

In an embodiment of the present invention, the transmission of the font information for a fixed-width 8×10 pixel font requires 10 bytes for each of the 256 characters in a font, or 2,560 bytes for the glyph information (again assuming that each text character is encoded with a single byte, producing a maximum of 256 characters in a font). The rest of the font information, the metrics, may require 10 bytes per character. Therefore, an entire 8 by 10 font requires 5,120 bytes to transmit to the display computer for caching. One of ordinary skill in the art will recognize these values are merely illustrative, and will vary depending upon the implementation chosen.

In an embodiment of the present invention, the glyph information can be compressed itself before transmission to further reduce its bandwidth requirements. Examples of compression algorithms suitable for this task include entropy-based algorithms, such as LZ-77 or Huffman coding, or run-length encoding.

After a font is cached, each character in the text may require just 1 byte per transmission. Thus, an 80 column by 30 line page of text would only require 2,400 bytes to transmit, as opposed to 24,000 bytes under the old system of transmitting each character as a glyph. The savings are even greater if an entropy encoding scheme is used to further compress the transmitted text strings.

In one embodiment of the present invention, the term "font" is an example of a set of character images. Fonts are typically composed of character images of the letters of the alphabet, numbers, and punctuation as well as other special characters. Each font is identified by a unique identifier which can be either a memory pointer or an assigned number. In this application, the term "font" need not imply the entire set of character images associated with the font. The term may also be used to refer to a subset of the character images associated with the font.

Moving now to direct drawing and pixmaps, text is typically drawn to a screen by the X-server in one of two ways: directly to an on-screen window (known as direct drawing) or first to an off-screen staging area (known as a pixmap), which is later copied to the screen. In the first case, when the text string is drawn, the DDX may check whether the font is already cached on the client. If so, it may send a "text" command where each character is represented by a single byte. The display computer may use its cached font information to draw the text to its screen. If the font is not already cached, the host computer may fetch the font information and transmit it to the client with the instruction to cache it for later use. In the case where the memory allocated to the display computer's cache is full, one or more older fonts may be replaced by this new font. This replacement step is described further below.

The second case, where the text is first drawn to a pixmap as part of a more complex image and then the pixmap is later copied to the screen, can be more difficult. In an embodiment of the present invention, a data structure may be maintained with each pixmap that provides whatever information is necessary and useful to determine where the text is in the complex image. In the DDX layer of the X-server, the data structure can be attached to the pixmap resource by using the pixmap devPrivates facility.

In one embodiment of the present invention, the data structure may identify the areas of the pixmap which were drawn with a text command. The data structure may comprise a linked list, where each entry in the linked list contains a text string, a reference to its font, its (x, y) position in the pixmap, its foreground color, a region describing its extents, and optionally its background color.

When a pixmap is finally copied to the screen (via a CopyArea to a realized window), the text region for a linked list entry may be translated from pixmap to screen coordinates and intersected with the composite clip region. The result is the region of the screen containing (part of) the entry's text string. The text in this region may be transmitted to the display computer as a single "text" command, first transmitting and caching its font if necessary as is done in the direct draw case mentioned above.

Turning now to cache management and replacement, the display computer has a limited amount of memory it can dedicate to caching font information. Typically, the display computer allocates a fixed amount of memory for caching fonts at boot time, however, this memory pool can change size at any time without any significant effect on the present invention. The specific amount of memory which the display computer dedicates to caching fonts may be communicated to the host computer upon the display computer's boot-up. Any change in this information can also be later communicated to the host computer. The host computer may maintain a list of fonts it has asked the display computer to cache and their sizes. When the total size of all cached font information reaches the limit communicated from the display computer, the host computer may replace one or more existing cached fonts. Typically, this may happen when text needs to be displayed using a font not already cached. At this time, one or more existing fonts are replaced with the new font so as to stay under the maximum size of the cache on the display computer. The host computer may transmit the new font information to the display computer and ask it to replace one or more of the existing fonts.

In the present application, an embodiment of the present invention is described in the context of a modification of traditional X Windows technology for use with remote computing applications. However, one of ordinary skill in the art will recognize that other embodiments are possible and the present invention should not be limited to X Windows, Sun Ray™, or remote computing technology.

Figure 2:
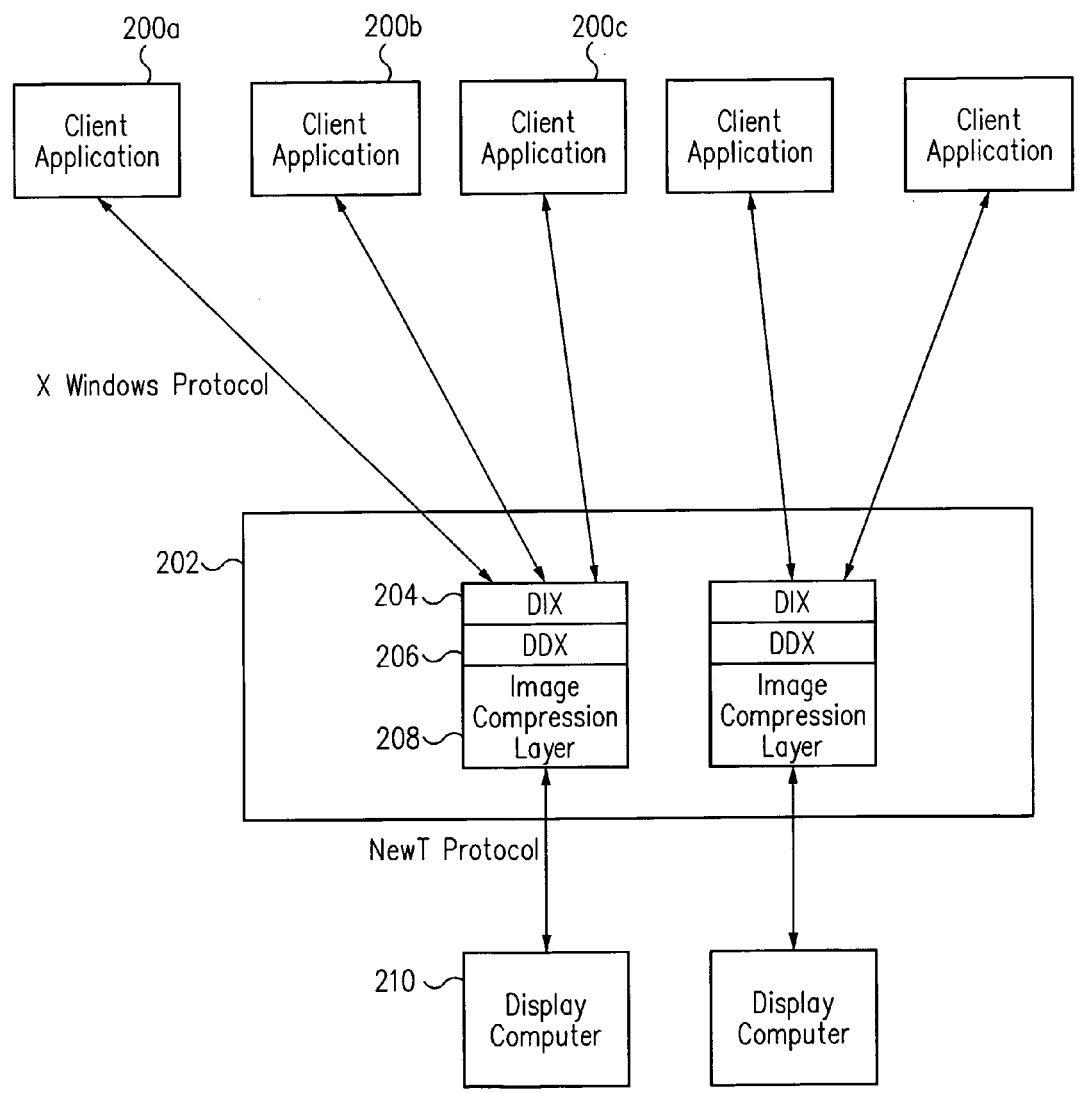
FIG. 2 is a block diagram illustrating a remote display application in accordance with an embodiment of the present invention.

FIG. 2 is a block diagram illustrating a remote display application in accordance with an embodiment of the present invention. Client applications 200a–200c send information to and receive information from the host computer 202 over the X Windows Protocol. Some of the information is text information. The host computer utilizes a device independent layer (DIX) 204 to act as a controlling layer, which handles initialization procedures and all device-independent handling of requests and events. A device dependent layer (DDX) 206 then is used to handle device dependent functionality. An image compression layer 208 may then be provided which performs the additional image compression techniques discussed in the present application. Alternatively, this image compression layer may simply be part of a modified DDX. The image compression layer 208 then communicates with display computer 210 using an enhanced version of the NewT protocol.

In a specific embodiment of the present invention, the region of the pixmap which was rendered using a text command may be tracked. An entry may be maintained for each text string, for example in a list of regions, text strings, fonts, and colors. This list could be a linked list, an array, or some other data structure. When the pixmap is copied onto a realized window, each text string may be sent to the display computer separately from other text strings.

The linked list may be associated with the pixmap through the use of the DDX pixmap devPrivates facility, which allows an X extension to attach a private data structure to each X pixmap.

A specific embodiment of the present invention may be used in conjunction with an "RGB region" which identifies the portions of the pixmap composed of RGB sub-images. For purposes of this application, an RGB image may be defined as one that is rendered from a list of pixel values (in contrast to an image rendered from a specification of a geometric figure or text characters to draw). In a drawing program, such an image may be an imported JPEG image where the pixel values are computed from the compressed JPEG data. In an X Server, this may be an image drawn with the XPutImage command, where the pixel values are provided directly by the client application. XPutImage copies the image data in an XImage structure into an area of a window or pixmap. This is the typical way to create many-colored images on an X server, as the other drawing primitives are typically used to draw only one or two colors at a time.

While XPutImage is a specific command in the X Windows System, the term put image command may be used in the present application to refer to any rendering command used to create an RGB image.

A specific embodiment of the present invention may be used in conjunction with a "Fill region" which identifies the portions of the pixmap composed of single-colored sub-images. For purposes of this application, a single-colored image may be defined as one where every pixel in the image has the same color (RGB value). In a drawing program, such an image may result from drawing a filled rectangle. In an X server, this may be an image drawn with an opaque XFillRectangle command with the solid fill style. In the case of the X Windows System, a PolyFillRect command is opaque when the graphics context indicates that (a) all color planes are affected; (b) the logical function is GXcopy, GXclear, GXset, or GXcopyInverted; and (c) the fill style is solid, tiled, or opaque stippled (i.e., the style is not stippled). In this application, drawing command which create single-colored images will be known generically as fill commands.

While XFillRectangle is a specific command in the X Windows System, the term fill rectangle command may be used in the present application to refer to any rendering command used to create a single-colored image.

It is frequent that other drawing commands create sub-images on top of single-color fill images. In one embodiment of the present invention, when drawing (e.g., of text) occurs on top of an existing fill region, the drawn-to region is subtracted from the fill region. When the pixmap is copied onto a realized window (via CopyArea), the fill regions may be sent first via 1-color rectangle protocol commands, followed by the RGB region, followed by the remainder of the source image. This may be termed the "disjoint" embodiment.

In another embodiment of the present invention, the fills are treated as underlays of the subsequent drawing (e.g., of text). This may be termed the "underlay" embodiment. In this embodiment, only drawing commands which affect large, rectangular portions of the pixmap have their drawn-to regions subtracted from the fill regions. Examples of such commands would be PolyFillRect and PutImage. The drawn-to regions of other commands are instead added to either a text region or a "miscellaneous region". This miscellaneous region tracks the region of the pixmap that contains non-fill, non-RGB, non-text image data drawn on top of a fill region. When the pixmap is copied onto a realized window (via CopyArea), the fill regions are sent first and then the text, miscellaneous and RGB regions are sent. Because the fill regions are not broken up by the subtraction of subsequent drawn-to regions, this embodiment has the advantage of minimizing the number of rectangles in the fill region. Because each rectangle in a region results in a separate protocol command, this minimizes the bandwidth used to send the fill region. But in situations where a pixmap is copied to a realized window, modified, and then copied again, this embodiment has the disadvantage of producing a momentary "flash" when the old non-fill image data are temporarily obscured by the fill underlay.

The flash can be prevented if the display computer rebuilds the composite image off-screen and then copies the complete image onto the screen after the miscellaneous and RGB regions are received. The instantaneous update has the further advantage of not distracting the user by the piecemeal reconstruction of the composite image. Thus, this embodiment results in the best user experience while minimizing the bandwidth used in sending the single-color image regions.

The miscellaneous region may optionally be maintained in the disjoint embodiment as well, to allow quick identification of the region that is not contained in the fill, text, or RGB regions. It is also useful as a debugging aid, by allowing two consistency checks: (1) a check that the entire source image is described by the union of fill, RGB, text, and miscellaneous region tags, and (2) a check that none of the region tags overlap.

Figure 3:
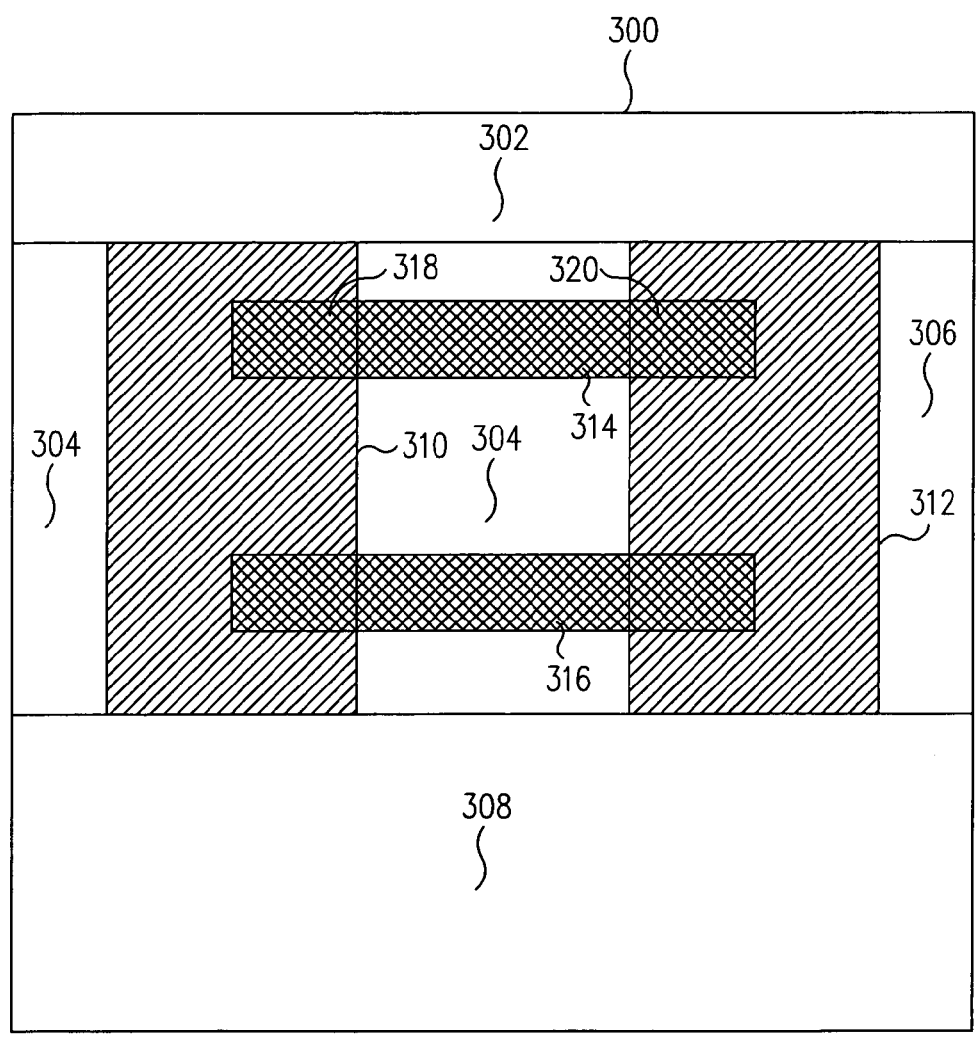
FIG. 3 is a diagram illustrating an example execution of an embodiment of the present invention.

FIG. 3 is a diagram illustrating an example execution of an embodiment of the present invention. In this embodiment, the "underlay" model is used. In this example, the pixmap 300 is being copied to a realized (i.e. on-screen) window in the X server using the CopyArea command. One possible drawing sequence that could have rendered the pixmap is as follows. First, the pixmap 300 is created. At this point, its fill linked list, its text linked list, and its RGB and miscellaneous regions are initialized to empty. Then a fill of color 0 is applied to the entire pixmap 300 using an opaque PolyFillRect command, resulting in a single fill rectangle for the entire pixmap 300. PolyArc is used to create the miscellaneous region 310, then PutImage is used to create the RGB region 312. From these two drawing commands, the single fill rectangle is broken into the fill rectangles 302, 304, 306, and 308. Note that rectangle 304 extends under miscellaneous region 310. Then two text regions are created. First a PolyText command creates region 314. The miscellaneous and RGB regions 310 and 312 are subtracted from the drawn-to region of the new text region 314. Thus, rectangles 318 and 320 of the PolyText command remain as parts of the miscellaneous and RGB regions, respectively. The rectangles 318 and 320 are considered part of the miscellaneous and RGB regions, respectively, because the PolyText command does not draw text opaquely, and therefore, the miscellaneous and RGB background remains. Because the underlay embodiment is being illustrated here, the fill rectangle 304 remains untouched (whereas a more complicated algorithm is used in the disjoint embodiment). Second, an ImageText command creates region 316. Because the underlay embodiment is being illustrated here, the fill rectangle 304 remains untouched (whereas the text region 316 would be subtracted from the fill region in the disjoint embodiment). The new text region 316 is subtracted from the RGB and miscellaneous regions 310 and 312. Because the ImageText command opaquely draws text, any underlying miscellaneous or RGB pixel data is overdrawn by the text command either by the text command's foreground or background color.

Figure 4A:
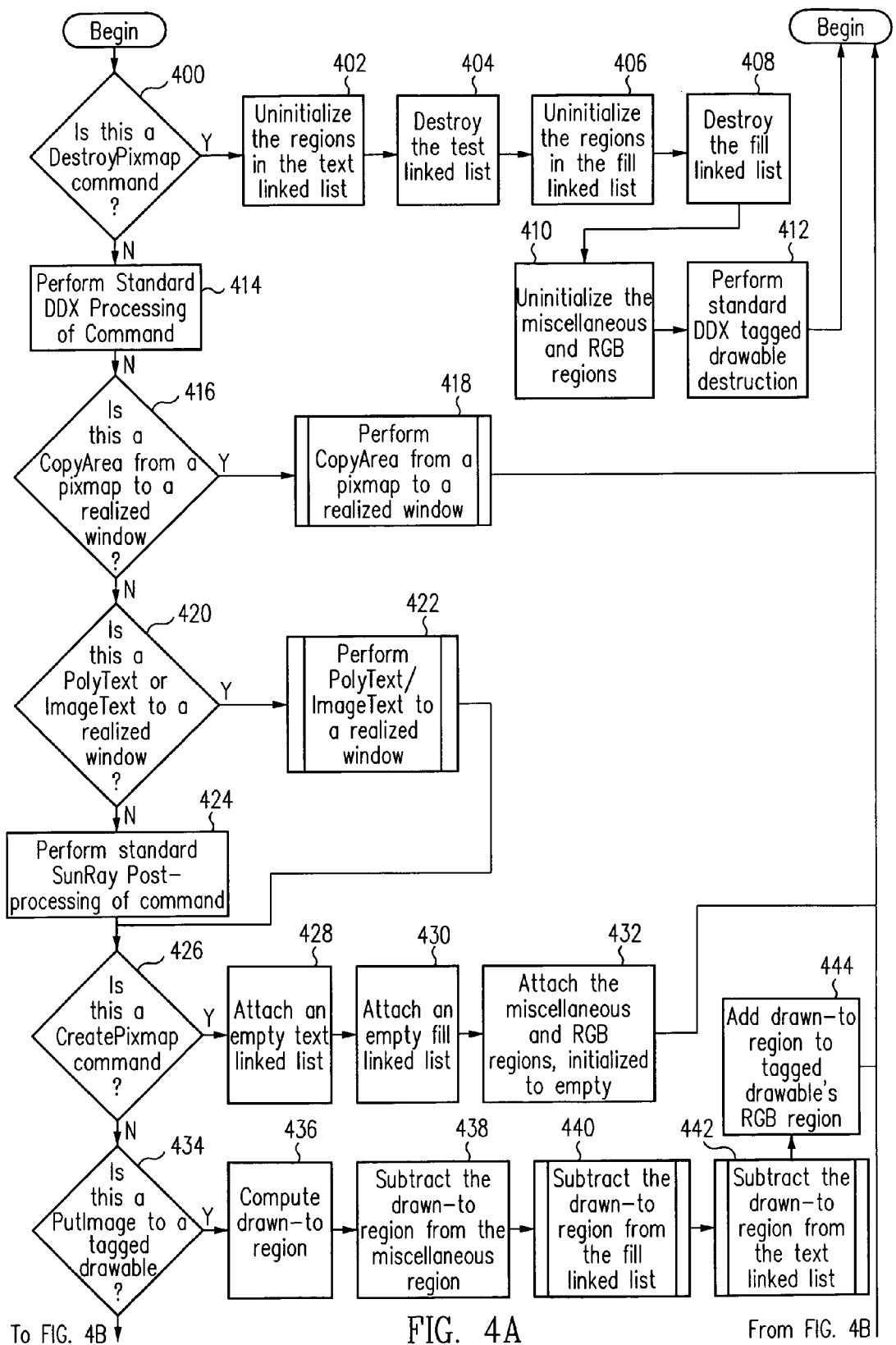
FIGS. 4A–4B are flow diagrams illustrating a method for reducing the storage or bandwidth requirements of a graphics image in a computer system in accordance with an embodiment of the present invention.
Figure 4B:
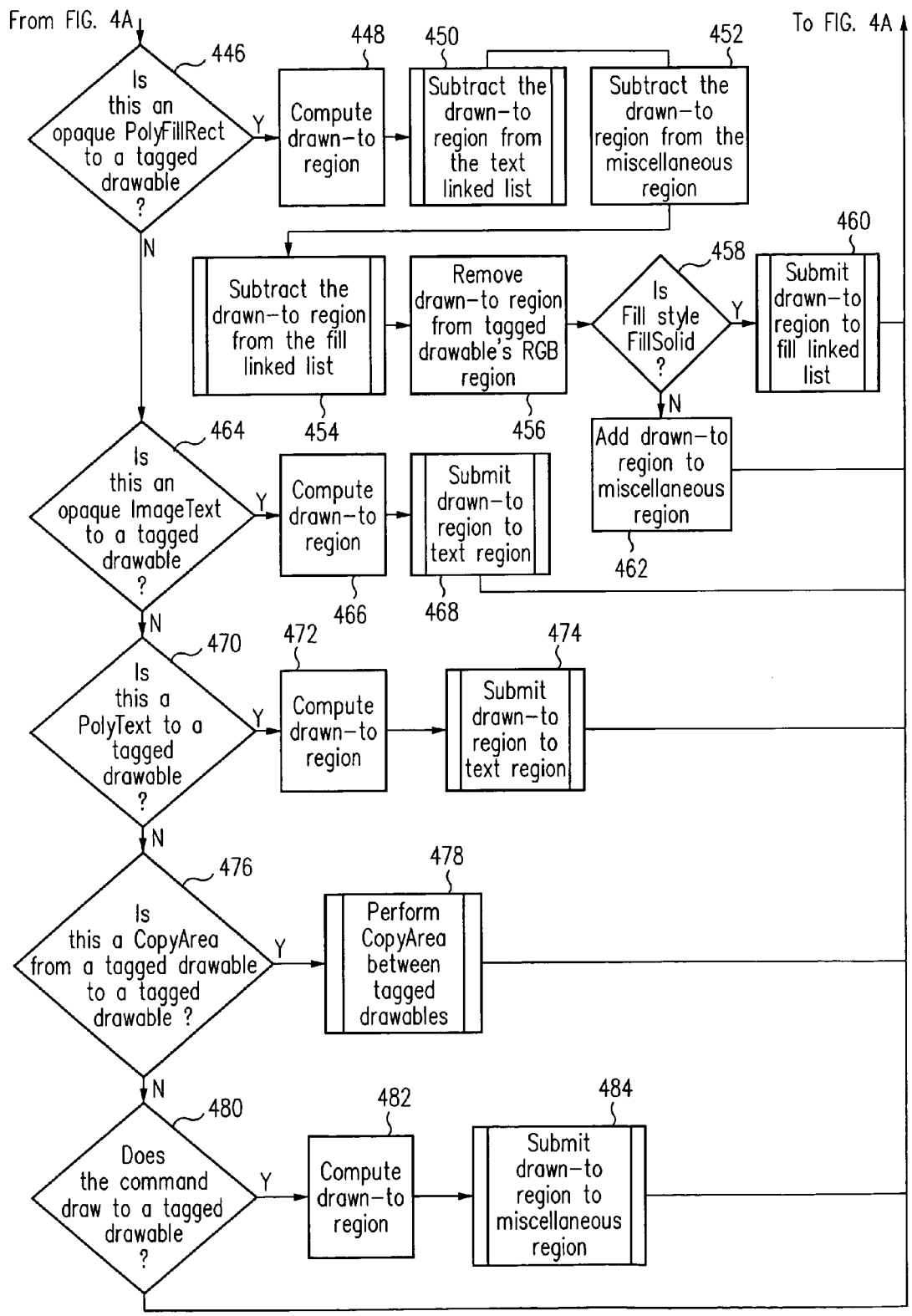

FIGS. 4A–4B are flow diagrams illustrating a method for reducing the storage or bandwidth requirements of a graphics image in a computer system in accordance with an embodiment of the present invention. These figures show the processing of a single DDX command in accordance with a specific embodiment of the present invention. These figures refer specifically to an embodiment where the Sun Ray™ server software is modified to practice the invention. One of ordinary skill in the art will recognize that this method may be modified for use with other remote display applications. In this embodiment, pixmap sub-images are identified with fill, RGB, text, and miscellaneous region tags using either the underlay or disjoint model. In this context, pixmaps can be referred to as "tagged drawables." Also in this embodiment, several DDX commands may require special handling. These include CreatePixmap, DestroyPixmap, PutImage, PolyFillRect, PolyText, ImageText, and CopyArea. Referring first to FIG. 4A, at 400, it is determined if the command is a DestroyPixmap command. It should be noted that one of ordinary skill in the art will recognize that a destroy pixmap command, any command utilized to destroy or remove a pixmap or pixmap-like structure, could be substituted for DestroyPixmap. If it is a DestroyPixmap command, then at 402, the regions in a text linked list may be uninitialized and the text linked list may be destroyed at 404. At 406, the regions in a fill linked list may be uninitialized and the fill linked list may be destroyed at 408. At 410, the miscellaneous and RGB regions may be uninitialized and at 412, standard DDX pixmap destruction may be performed. If it is not a DestroyPixmap command, then at 414 the standard DDX routine for the command may be performed.

Figure 5:
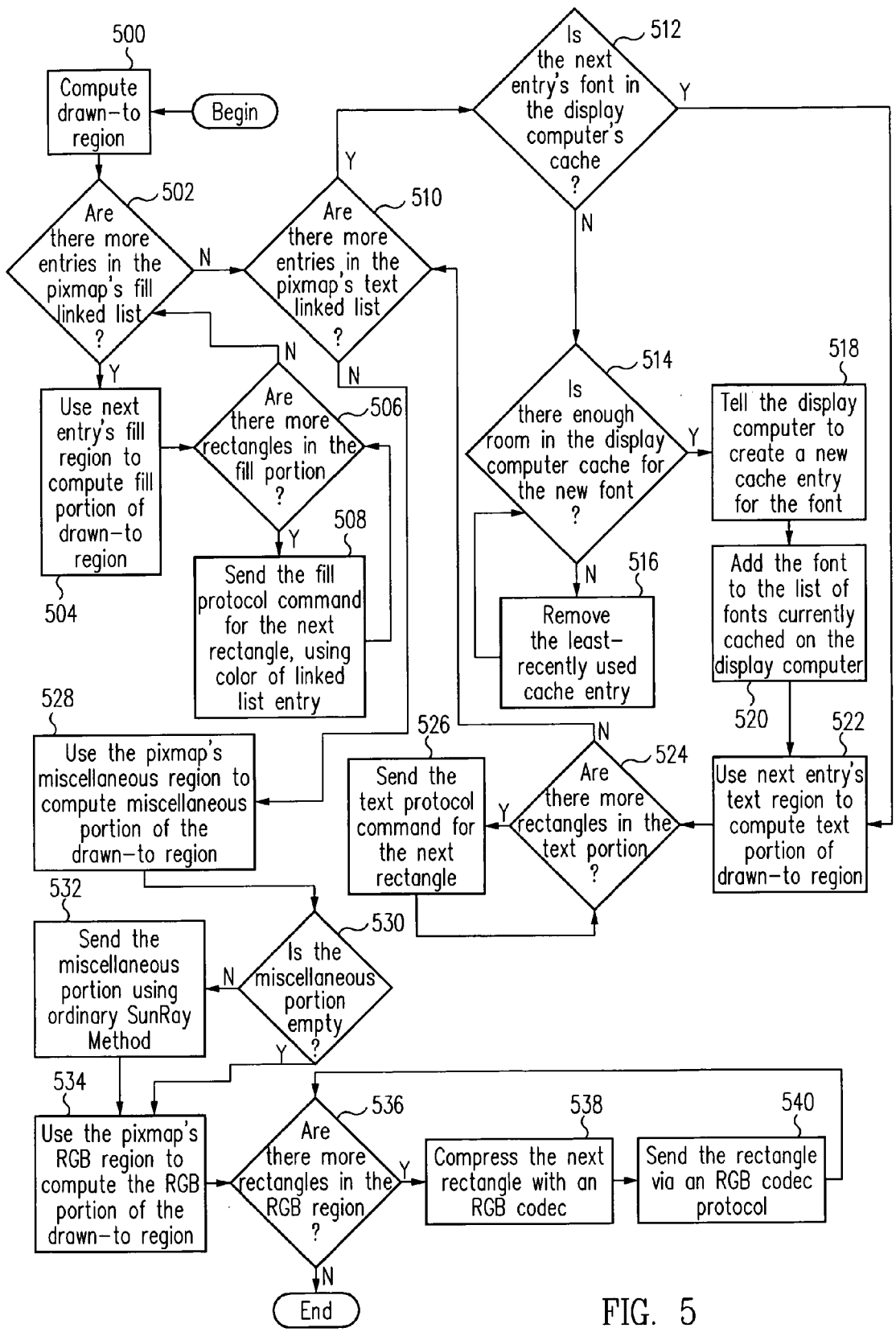
FIG. 5 is a flow diagram illustrating a CopyArea from a pixmap to a realized window in accordance with an embodiment of the present invention.

Then at 416 it may be determined if the command is a CopyArea from a pixmap to a realized window. If the command is a CopyArea from a pixmap to a realized window, then at 418 a CopyArea from a pixmap to a realized window is performed. This is described in more detail in FIG. 5. FIG. 5 is a flow diagram illustrating a CopyArea from a pixmap to a realized window in accordance with an embodiment of the present invention. At 500, the drawn-to region may be computed. At 502, it may be determined if there are more entries in the pixmap's fill linked list. If so, then at 504 the next entry's fill region may be used to compute the portion of the drawn-to region that contains fills of the color specified in the linked list entry. The region will contain zero rectangles if empty or more than zero if it is non-empty. Then it may be determined if there are any more rectangles in the fill portion at 506. If so, then the 1-color protocol command for the next rectangle is sent, using the color of the linked list entry at 508. This repeats until each rectangle is sent for each region defined by each entry in the fill linked list. Once that is complete, at 510 it may be determined if there are more entries in the pixmap's text linked list. If so, then at 512 it may be determined if the next entry's font is in the display computer's cache. If not, it needs to be added, and therefore at 514 it is determined if there is enough room in the display computer cache for the new font. If not, then at 516, the leastrecently used cache entry may be removed. This may be repeated until there is enough room in the display computer cache for the new font. Then at 518, the display computer may be told to create a new cache entry for the font, and at 520 the font then may be added to the list of fonts currently cached on the display computer. This tells the display computer to create a new cache entry, which may include sending character image and metric information. Following this, or if at 512 it was determined that the next entry's font was already in the display computer's cache, then at 522 the next entry's text region may be used to compute the text portion of the drawn to region. Then at 524, it may be determined if there are more rectangles in the text portion. If so, then at 526 the text protocol command for the next rectangle may be sent. This continues until all the rectangles have been sent, at which point the process returns to 510.

If at 510 it is determined that there are no more entries in the pixmap's text linked list, then at 528 the pixmap's miscellaneous region may be used to compute the miscellaneous portion of the drawn-to region. At 530, it may be determined if the miscellaneous portion is empty. If not, it may be sent using the ordinary Sun Ray™ method at 532. Then at 534, the RGB portion of the drawn-to region may be found by translating the RGB region of the source pixmap to the destination coordinates and intersecting with the drawn-to region. The destination coordinates are those screen coordinates to which the CopyArea command copies the pixmap. Then at 536, it may be determined if there are more RGB rectangles. Then, for each rectangle in the RGB portion, the rectangle may be compressed using an appropriate method (e.g., an RGB codec) at 538 and sent via a protocol command at 540. When the last RGB rectangle is sent, processing is complete.

Figure 6:
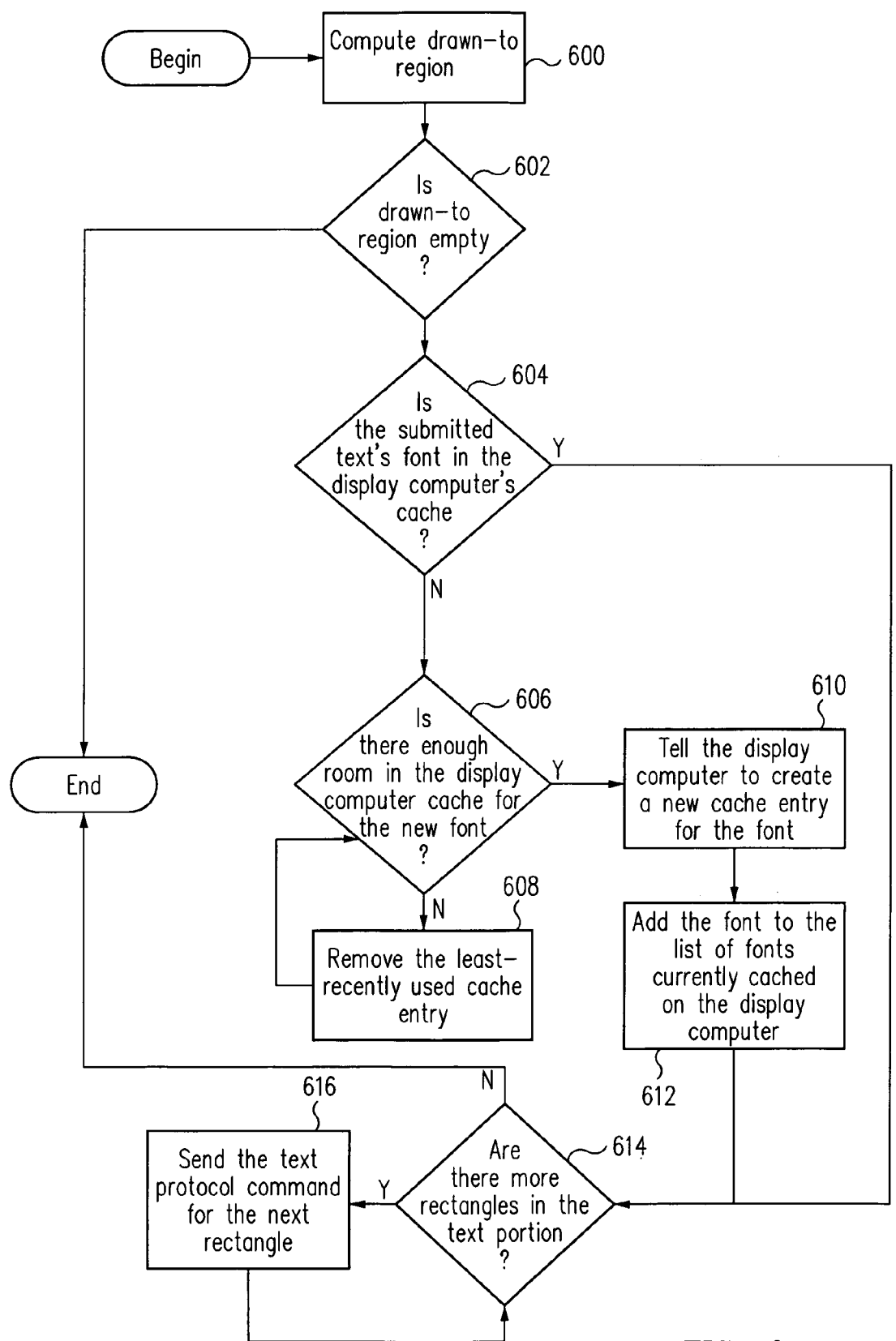
FIG. 6 is a flow diagram illustrating a method for performing a PolyText or ImageText command to a realized window in accordance with an embodiment of the present invention.

Returning now to FIG. 4A, if the command is not a CopyArea from a pixmap to a realized window, then at 420 it may be determined if it is a PolyText or ImageText command to a realized window. If so, then at 422 the PolyText or ImageText to a realized window may be performed. This is described in more detail in FIG. 6. FIG. 6 is a flow diagram illustrating a method for performing a PolyText or ImageText to a realized window in accordance with an embodiment of the present invention. At 600, the drawn-to region may be computed. At 602, it may be determined if the drawn-to region is empty. If not, then at 604 it may be determined if the submitted text's font is in the display computer's cache. If not, then at 606 it may be determined if there is enough room in the display computer cache for the new font. If not, then at 608 a loop is entered wherein the least-recently used cache entry may be removed from the display computer cache until there is enough room for the new font. At 610, the display computer may be told to create a new cache entry for the font. Then at 612, the font may be added to the list of fonts currently cached on the display computer.

If at 604 it was determined that the submitted text's font was already in the display computer's cache, or it was not originally but is now, then at 614 it may be determined if there are more rectangles in the text portion. If so, then the text protocol command for the next rectangle is sent at 616. This may be repeated until there are no more rectangles in the text portion. If at 602 it was determined that the drawn-to region was empty, the process may end.

Referring back to FIG. 4A, if at 420 it is determined that the command is not a PolyText or ImageText to a realized window, then the system may simply perform standard Sun Ray™ post-processing of the command at 424. For example, if the command renders to a realized window, then the Sun Ray™ software sends the appropriate screen update information to the display computer.

At 426, it may be determined if the command is a CreatePixmap command. It should be noted that one of ordinary skill in the art will recognize that a create pixmap command, any command utilized to create a pixmap or pixmap-like structure, could be substituted for CreatePixmap. If the command is a CreatePixmap command, then at 428 an empty text linked list may be attached to the pixmap. Then, at 430 an empty fill linked list may be attached to the pixmap, and at 432 the miscellaneous and RGB regions may be attached to the pixmap and initialized to empty.

Figure 7:
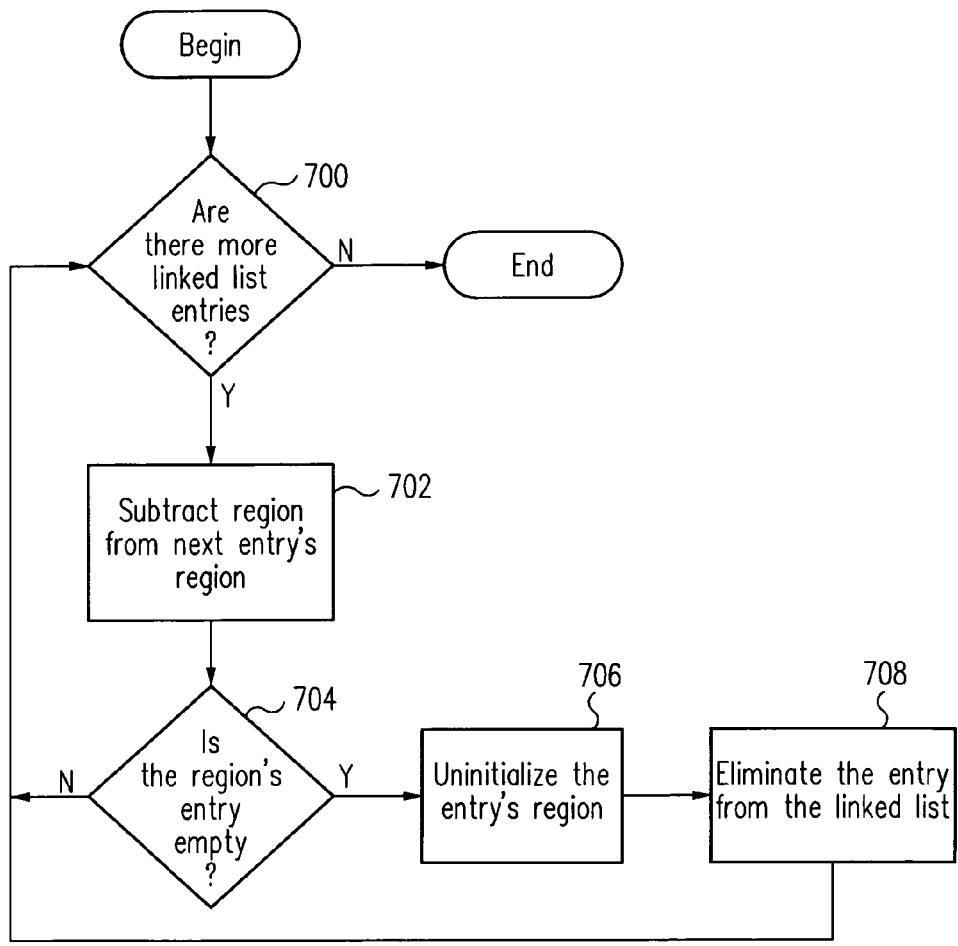
FIG. 7 is a flow diagram illustrating a method for subtracting the drawn-to region from a linked list in accordance with an embodiment of the present invention.

If the command is not a CreatePixmap command, then at 434 it may be determined if the command is a PutImage to a tagged drawable. It should be noted that one of ordinary skill in the art will recognize that a put image command, any command utilized to create an RGB image, may be substituted for PutImage. If so, then at 436 the drawn-to region may be computed. At 438, the drawn-to region may be subtracted from the miscellaneous region. At 440, the drawn-to region may be subtracted from the fill linked list. This is described in more detail in FIG. 7. FIG. 7 is a flow diagram illustrating a method for subtracting the drawn-to region from a linked list in accordance with an embodiment of the present invention. FIG. 7 describes a process generally for any type of linked list, but it will have specific application to fill and text linked lists. At 700, it may be determined if there are more linked list entries. If not, then the process ends and it returns to FIG. 4A or 4B, as appropriate. If so, then at 702, the drawn-to region may be subtracted from the next entry's region. At 704, it may be determined if the region's entry is empty. If so, the entry's region may be uninitialized at 706 and removed from the linked list at 708. Referring back to FIG. 4A, at 442, the drawn-to region may be subtracted from the text linked list. This may also follow FIG. 7, except with reference to the text linked list. At 444, the drawn-to region may be added to the pixmap's RGB region.

Figure 8:
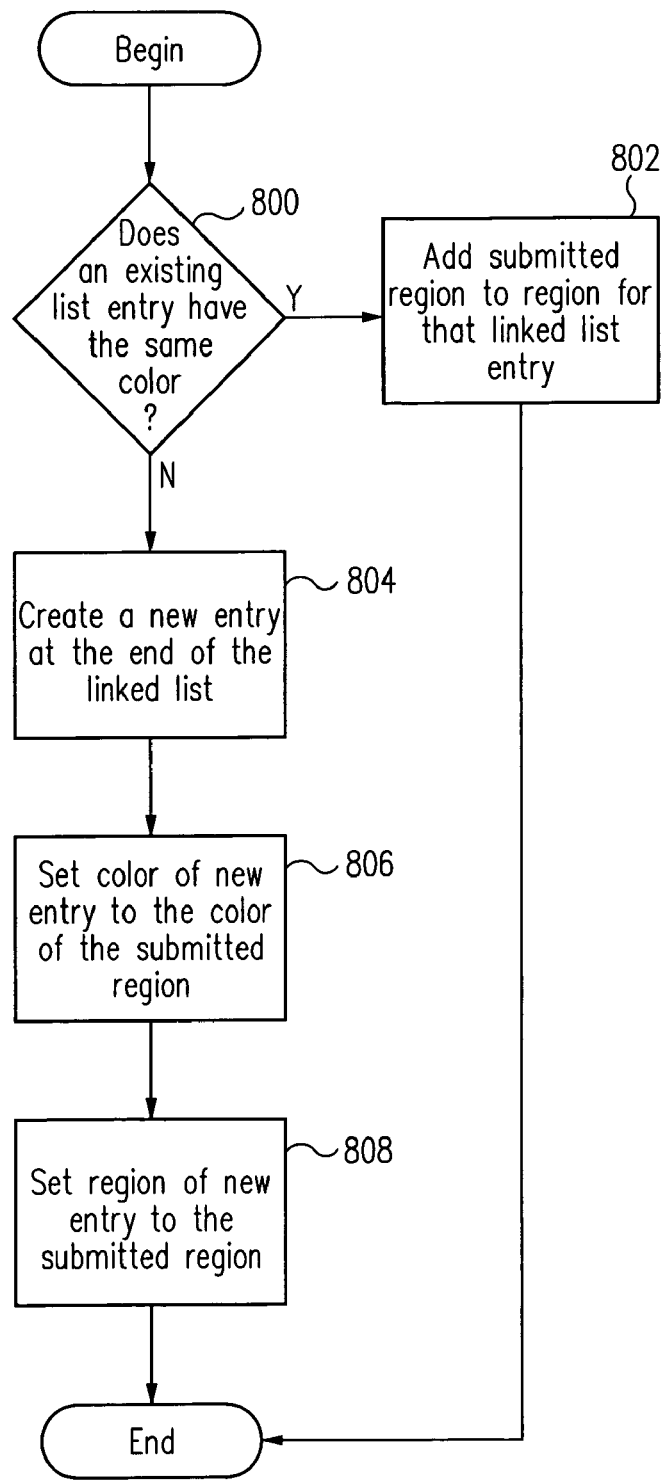
FIG. 8 is a flow diagram illustrating a method for submitting a region to a fill linked list in accordance with an embodiment of the present invention.

Referring now to FIG. 4B, if the command is not a PutImage to a tagged drawable, then at 446 it may be determined if the command is an opaque PolyFillRect to a tagged drawable. It should be noted that one of ordinary skill in the art will recognize that an opaque poly fill rectangle command, any command utilized to overwrite a rectangle with a single color or a tiled pattern, could be substituted for PolyFillRect. PolyFillRect commands are frequently used to set a region to the background color or pattern. In the case of the X Windows System, a PolyFillRect command is opaque when the graphics context indicates that (a) all color planes are affected; (b) the logical function is GXcopy, GXclear, GXset, or GXcopyinverted; and (c) the fill style is solid, tiled, or opaque stippled (i.e., the style is not stippled). If the command is an opaque PolyFillRect command, then at 448 the drawn-to region may be computed. Then at 450, the drawn-to region may be subtracted from the text linked list. This may follow the process described in FIG. 7 above. Then at 452, the drawn-to region may be subtracted from the miscellaneous region. At 454, the drawn-to region may be subtracted from the fill linked list. This may follow the process described in FIG. 7 above. At 456, the drawn-to region may be removed from the tagged drawable's RGB region. At 458, it may be determined if the fill style is FillSolid. If so, then at 460, the drawn-to region is submitted to the fill linked list. This is described in more detail in FIG. 8. FIG. 8 is a flow diagram illustrating a method for submitting a region to a fill linked list in accordance with an embodiment of the present invention. At 800, it may be determined if an existing linked list entry has the same color as the submitted region. If so, then at 802, the submitted region may be added to that linked list entry. If not, a new entry may be created at the end of the linked list at 804. Then at 806, the color of the new entry may be set to the color of the submitted region. At 808, the region of the new entry may be set to the submitted region. Referring back to FIG. 4B, if the fill style is not FillSolid, then at 462 the drawn-to region may be added to the miscellaneous region.

Figure 9:
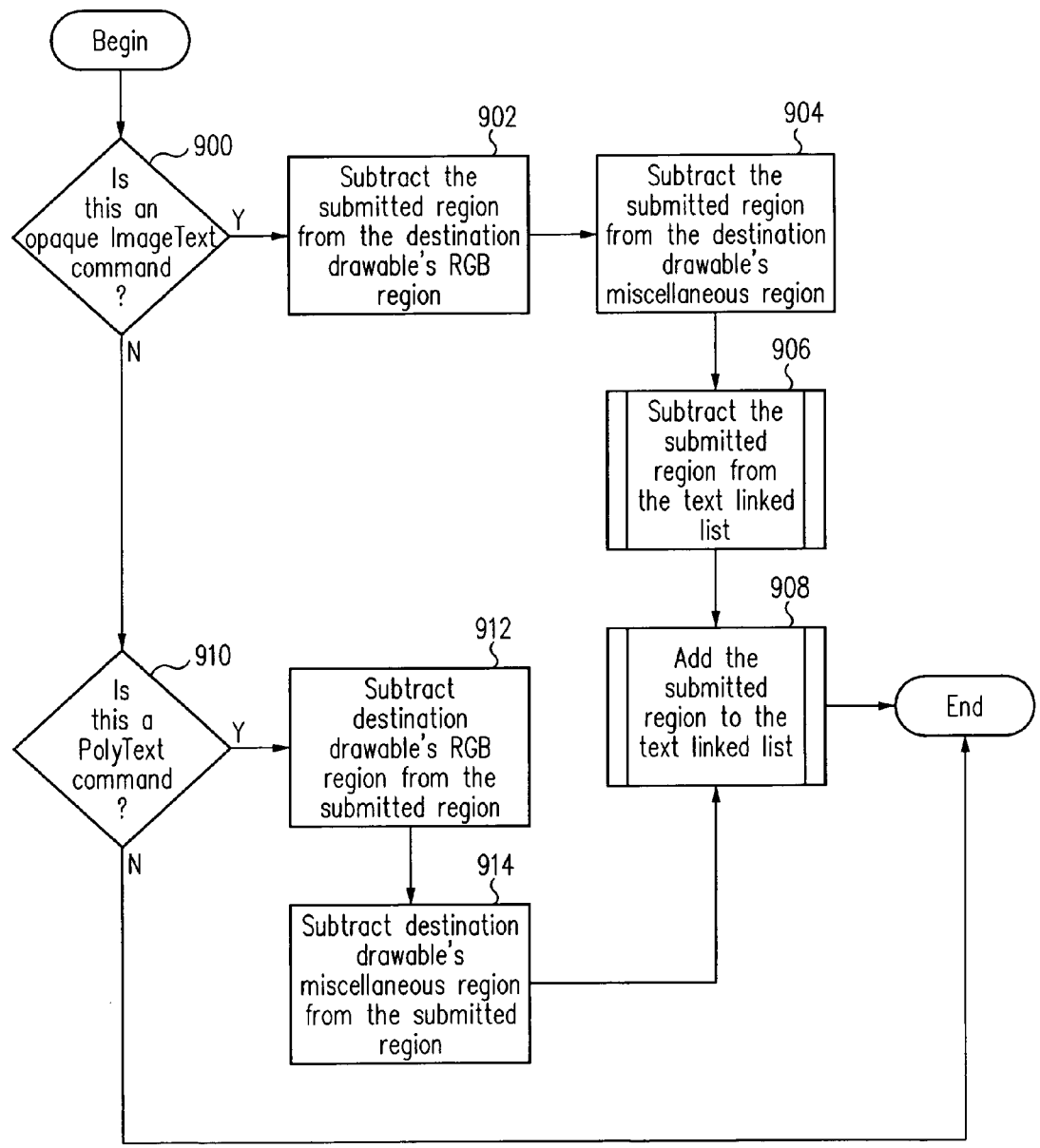
FIG. 9 is a flow diagram illustrating a method for submitting a region to the text region under the "underlay" embodiment of the present invention.

If the command is not an opaque PolyFillRect to a tagged drawable, then at 464 it may be determined if the command is an opaque ImageText to a tagged drawable. If so, at 466, the drawn-to region may be computed. Then at 468, the drawn-to region may be submitted to the text region and processing is complete. This is described in more detail in FIGS. 9 and 10. FIG. 9 is a flow diagram illustrating a method for submitting a region to the text region under the "underlay" embodiment of the present invention. At 900, it may be determined if the command is an opaque ImageText command. If so, then at 902, the submitted region may be subtracted from the destination drawable's RGB region. Then at 904, the submitted region may be subtracted from the destination drawable's miscellaneous region. Following this, at 906, the submitted region may be subtracted from the text linked list, again following the process described in FIG. 7 above. Then at 908, the submitted region may be added to the text linked list. This is described in more detail in FIG. 11. FIG. 11 is a flow diagram illustrating a method for adding a submitted region to the text linked list in accordance with an embodiment of the present invention. At 1100, it may be determined if there is an existing linked list entry having the same font, color(s), text string, and position as the submitted region. If so, then at 1102 the submitted region may be added to the existing linked list entry. If not, then at 1104, a new entry may be created at the end of the linked list. Then at 1106, the font, color(s), text string, and position of the new entry may be set to that of the submitted region. Finally, at 1108, the region of the new entry may be set to the submitted region. Returning to FIG. 9, once 908 has completed, the process described in FIG. 9 is complete. If at 900 it was determined that the command was not an opaque ImageText command, then at 910 it may be determined if the command is a PolyText command. If not, then the process described in FIG. 9 is complete. If so, then at 912 the destination drawable's RGB region may be subtracted from the submitted region. Then at 914 the destination drawable's miscellaneous region may be subtracted from the submitted region. Finally, at 908 the submitted region may be added to the text linked list, as described in FIG. 11 above.

Figure 10:
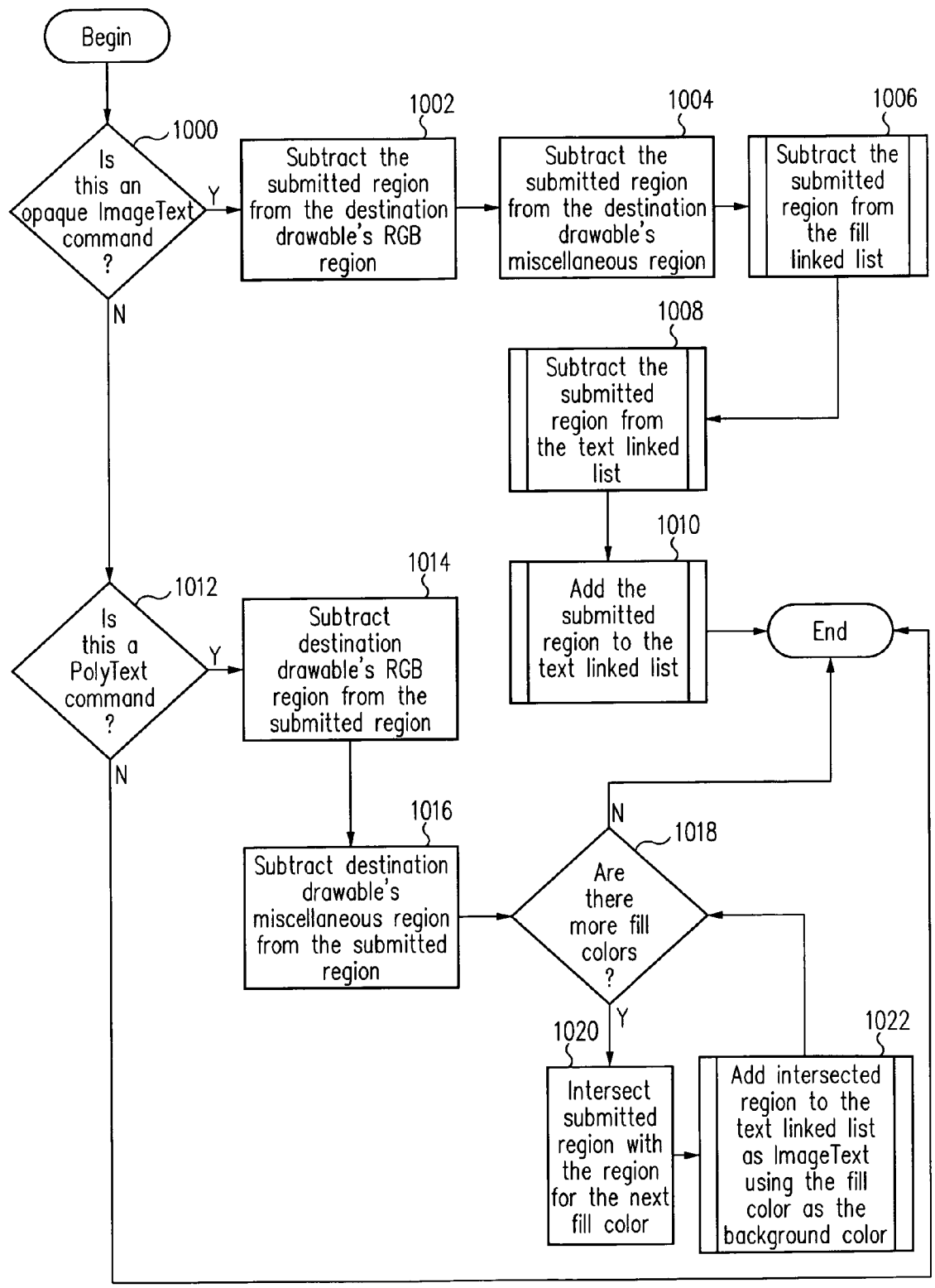
FIG. 10 is a flow diagram illustrating a method for submitting a region to the text region under the "disjoint" embodiment of the present invention.
Figure 11:
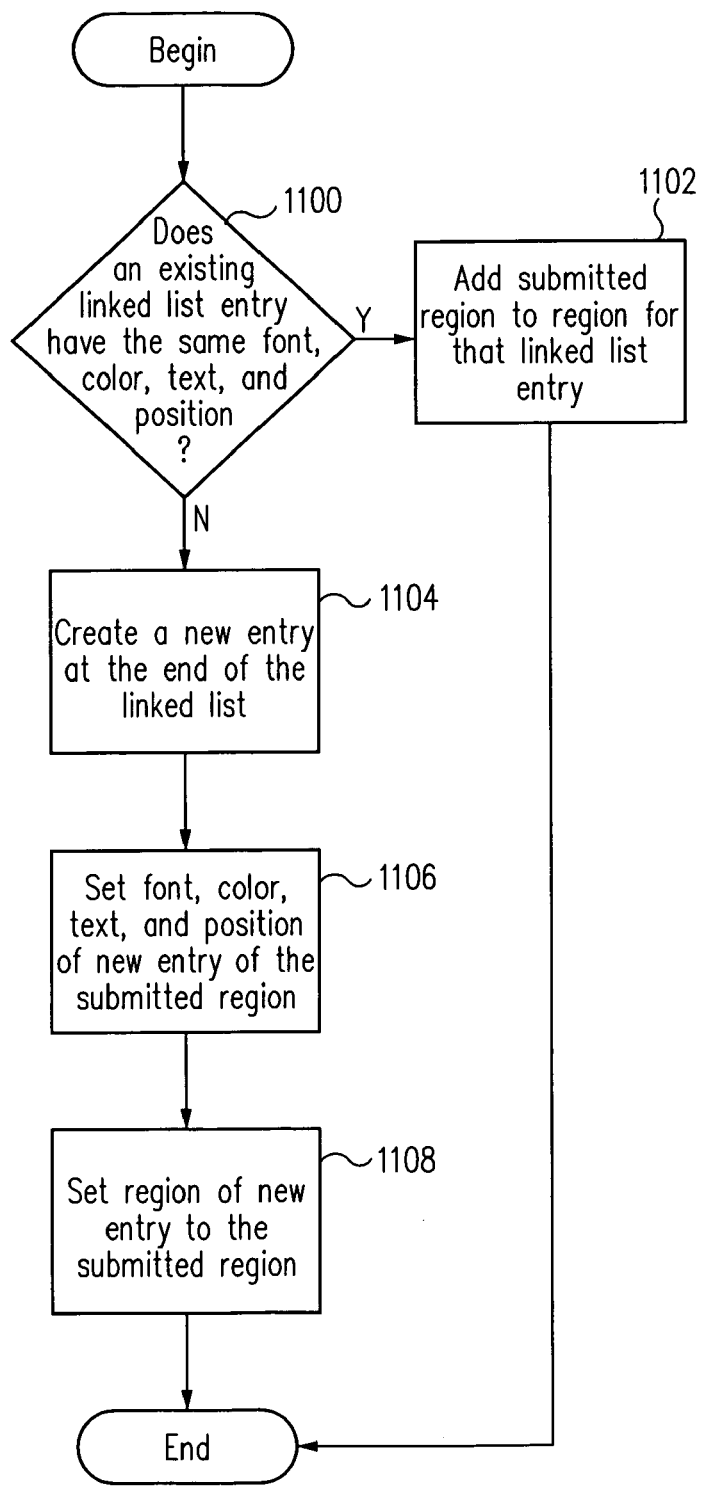
FIG. 11 is a flow diagram illustrating a method for adding a submitted region to the text linked list in accordance with an embodiment of the present invention.

FIG. 10 is a flow diagram illustrating a method for submitting a region to the text region under the "disjoint" embodiment of the present invention. At 1000, it may be determined if the command is an opaque ImageText command. If so, then at 1002, the submitted region may be subtracted from the destination drawable's RGB region. Then at 1004, the submitted region may be subtracted from the destination drawable's miscellaneous region. Then at 1006, the submitted region may be subtracted from the fill linked list. This may be accomplished by following the process described in FIG. 7 above. Following this, at 1008, the submitted region may be subtracted from the text linked list, again following the process described in FIG. 7 above. Then at 1010, the submitted region may be added to the text linked list. This is described in more detail in FIG. 11 above. If at 1000 it was determined that the command was not an opaque ImageText command, then at 1012 it may be determined if the command is a PolyText command. If not, then the process described in FIG. 10 is complete. If so, then at 1014 the destination drawable's RGB region may be subtracted from the submitted region. Then at 1016 the destination drawable's miscellaneous region may be subtracted from the submitted region. Then at 1018, it may be determined if there are more fill colors. If not, then the process in FIG. 10 ends. If so, then at 1020 the submitted region may be intersected with the region for the next fill color. Then at 1022 the intersected region may be added to the text linked list as ImageText setting the background color of the text region to be that of the fill color, as described in FIG. 11 above. 1020 and 1022 may be repeated until there are no more fill colors.

Returning to FIG. 4B, if at 464 it was determined that the command was not an opaque ImageText to a tagged drawable, then at 470 it is determined if the command is a PolyText to a tagged drawable. If so, then at 472 the drawn-to region may be computed. Then at 474, the drawn-to region may be submitted to the text region. This is described in more detail in FIGS. 9 and 10 above.

Figure 12:
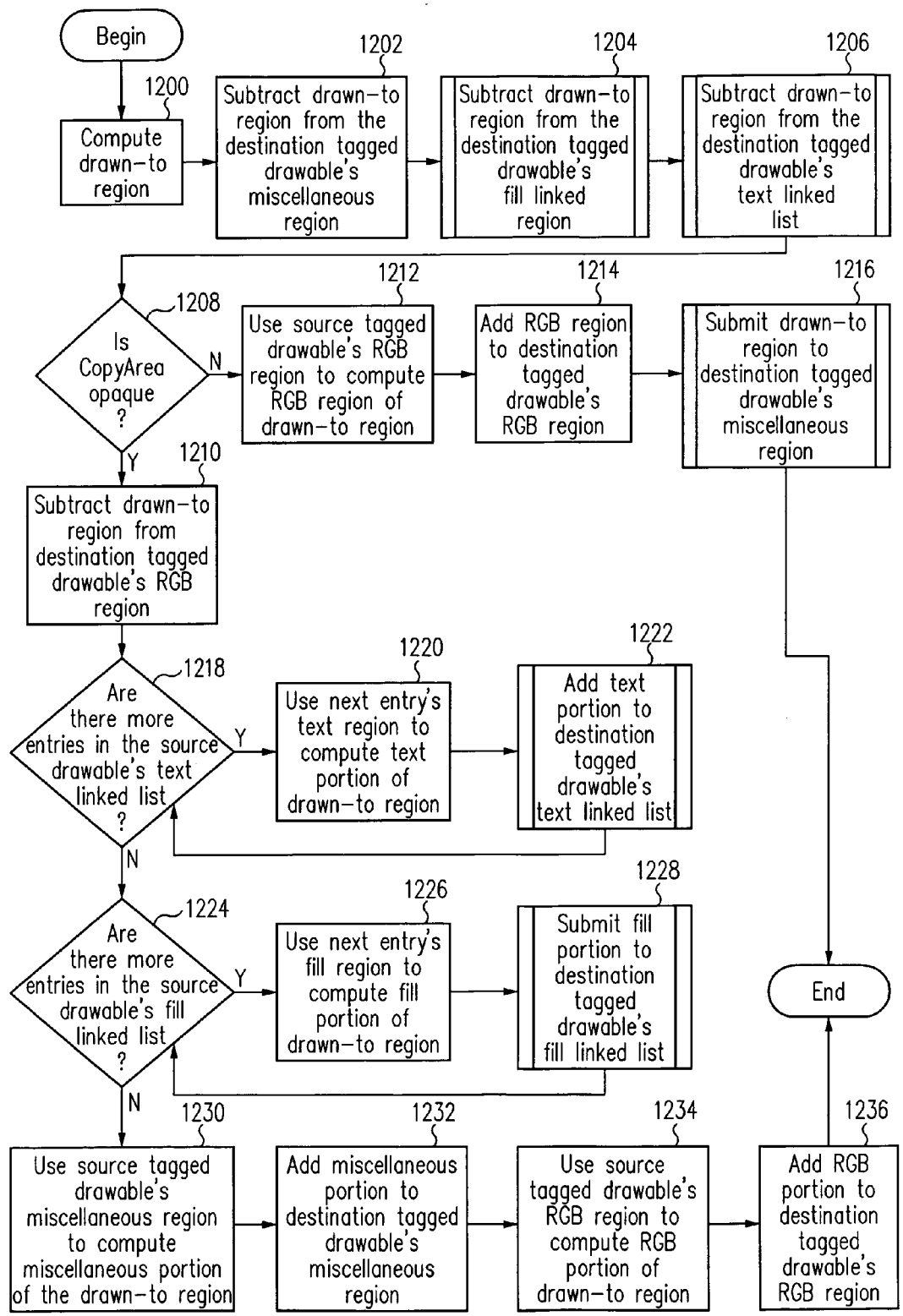
FIG. 12 is a flow diagram illustrating a method for performing a CopyArea between tagged drawables in accordance with an embodiment of the present invention.

If at 470 it was determined that the command was not a PolyText to a tagged drawable, then at 476 it may be determined if the command is a CopyArea from a tagged drawable to a tagged drawable. If so, then at 478 a CopyArea may be performed between tagged drawables. This is described in more detail in FIG. 12. FIG. 12 is a flow diagram illustrating a method for performing a CopyArea between tagged drawables in accordance with an embodiment of the present invention. At 1200, a drawn-to region may be computed. Then at 1202, the drawn-to region may be subtracted from the destination tagged drawable's miscellaneous region. Then at 1204, the drawn-to region may be subtracted from the destination tagged drawable's fill linked list. This is described in more detail in FIG. 7 above. Then at 1206, the drawn-to region may be subtracted from the destination tagged drawable's text linked list. This is also described in more detail in FIG. 7 above.

At 1208, it may be determined if the CopyArea command is opaque. If so, then at 1210 the drawn-to region may be subtracted from the destination tagged drawable's RGB region. If not, then at 1212, the source tagged drawable's RGB region may be used to compute the RGB region of the drawn-to region. Then at 1214, the RGB region may be added to the destination tagged drawable's RGB region. Then at 1216 the drawn-to region may be submitted to the destination tagged drawable's miscellaneous region. This is described in more detail in FIGS. 13 and 14.

Figure 13:
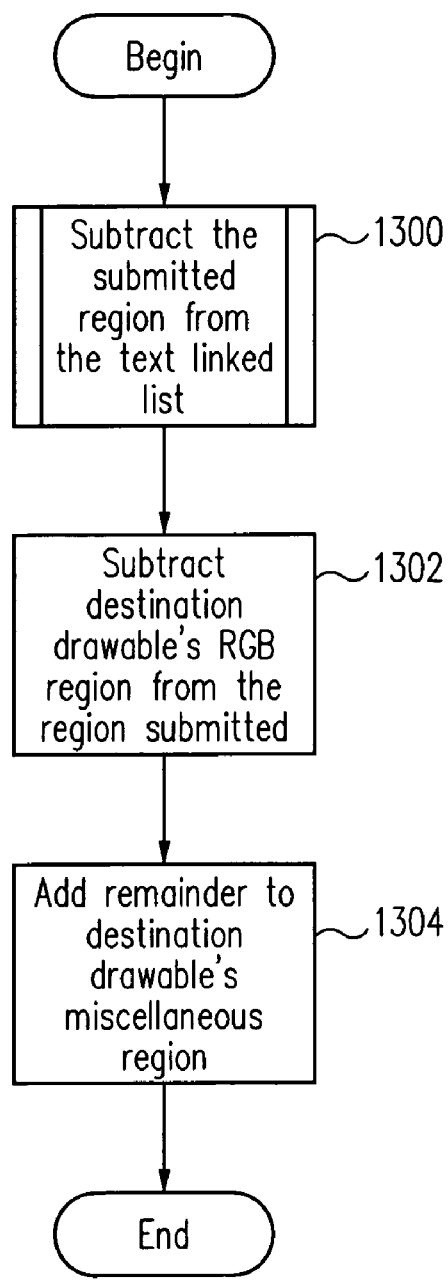
FIG. 13 is a flow diagram illustrating a method for submitting a region to a miscellaneous region in an "underlay" embodiment in accordance with an embodiment of the present invention.

FIG. 13 is a flow diagram illustrating a method for submitting a region to a miscellaneous region in an "underlay" embodiment in accordance with an embodiment of the present invention. At 1300, the submitted region may be subtracted from the text linked list. This is described in more detail in FIG. 7 above. At 1302, the destination drawable's RGB region may be subtracted from the region submitted. At 1304, the remainder may be added to the destination drawable's miscellaneous region.

Figure 14:
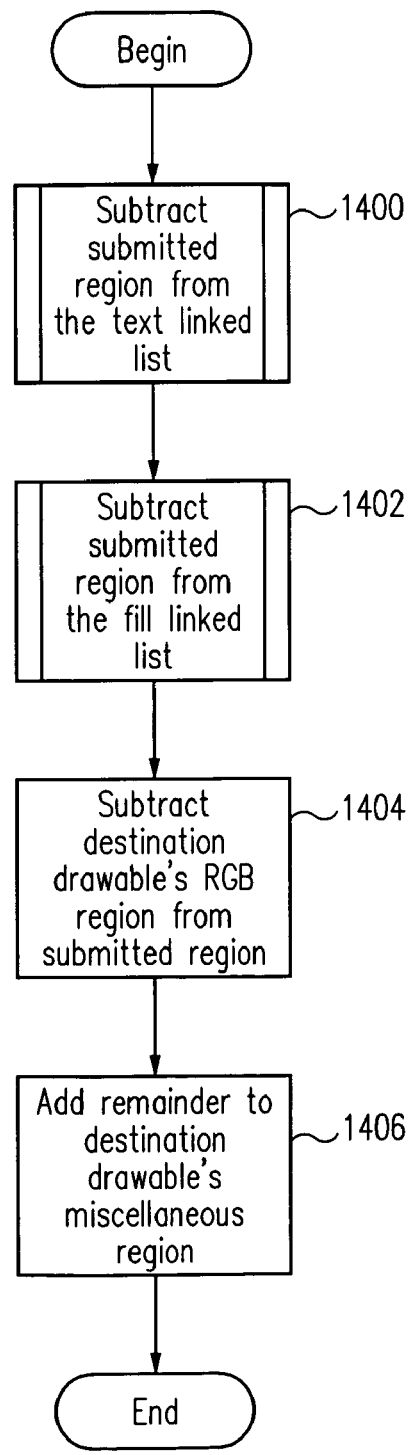
FIG. 14 is a flow diagram illustrating a method for submitting a region to a miscellaneous region in an "disjoint" embodiment in accordance with an embodiment of the present invention.

FIG. 14 is a flow diagram illustrating a method for submitting a region to a miscellaneous region in an "disjoint" embodiment in accordance with an embodiment of the present invention. At 1400, the drawn-to region may be subtracted from the text linked list. This is described in more detail in FIG. 7 above. At 1402, the submitted region may be subtracted from the fill linked list. This is described in more detail in FIG. 7 above. At 1404, the destination drawable's RGB region may be subtracted from the region submitted. At 1406, the remainder may be added to the destination drawable's miscellaneous region.

Returning back to FIG. 12, if at 1208 it was determined that CopyArea was opaque, then at 1218 it may be determined if there are more entries in the text linked list. If so, then at 1220 the next entry's text region may be used to compute one of the text portions of the drawn-to region. Then at 1222 the text portion may be added to the destination tagged drawable's text linked list. This is described in more detail in FIG. 11 above. This repeats until there are no more entries in the text linked list. At 1224, it may be determined if there are more entries in the fill linked list. If so, then at 1226 the next entry's fill region may be used to compute one of the fill portions of the drawn-to region. At 1228, the fill portion may be submitted to the destination tagged drawable's fill linked list. This is described in more detail in FIG. 8 above. This may repeat until there are no more entries in the fill linked list. At 1230, the tagged drawable's miscellaneous region may be used to compute the miscellaneous portion of the drawn-to region. At 1232, the miscellaneous portion may be added to the destination tagged drawable's miscellaneous region. At 1234, the source tagged drawable's RGB region may be used to compute the RGB portion of the drawn-to region. Then at 1236, the RGB portion may be added to the destination tagged drawable's RGB region.

Returning to FIG. 4B, if at 476 it was determined that the command was not a CopyArea from a tagged drawable to a tagged drawable, then at 480 it may be determined if the command draws to a tagged drawable. If so, then at 482 the drawn-to region may be computed. Then at 484, the drawn-to region may be submitted to the miscellaneous region. This is described in more detail in FIGS. 13–14 above.

Figure 15:
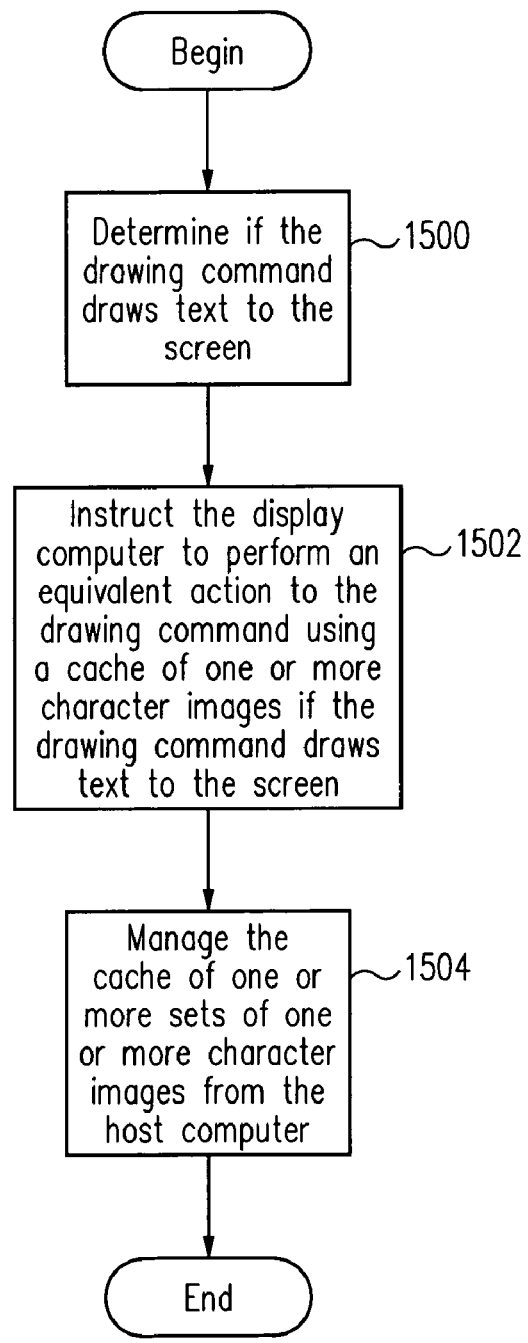
FIG. 15 is a flow diagram illustrating a method for processing a drawing command in a computer system having a host computer and a display computer in accordance with an embodiment of the present invention.

FIG. 15 is a flow diagram illustrating a method for processing a drawing command in a computer system having a host computer and a display computer in accordance with an embodiment of the present invention. At 1500, it may be determined if the drawing command draws text to the screen. At 1502, the display computer may be instructed to perform an equivalent action to the drawing command using a cache of one or more sets of one or more character images if the drawing command draws to the screen. At 1504, the cache of one or more sets of one or more character images may be managed from the host computer. This may include maintaining a list of sets of character images currently cached on the display computer, the list being maintained on the host computer, and updating the list as needed in response to the drawing command.

Figure 16:
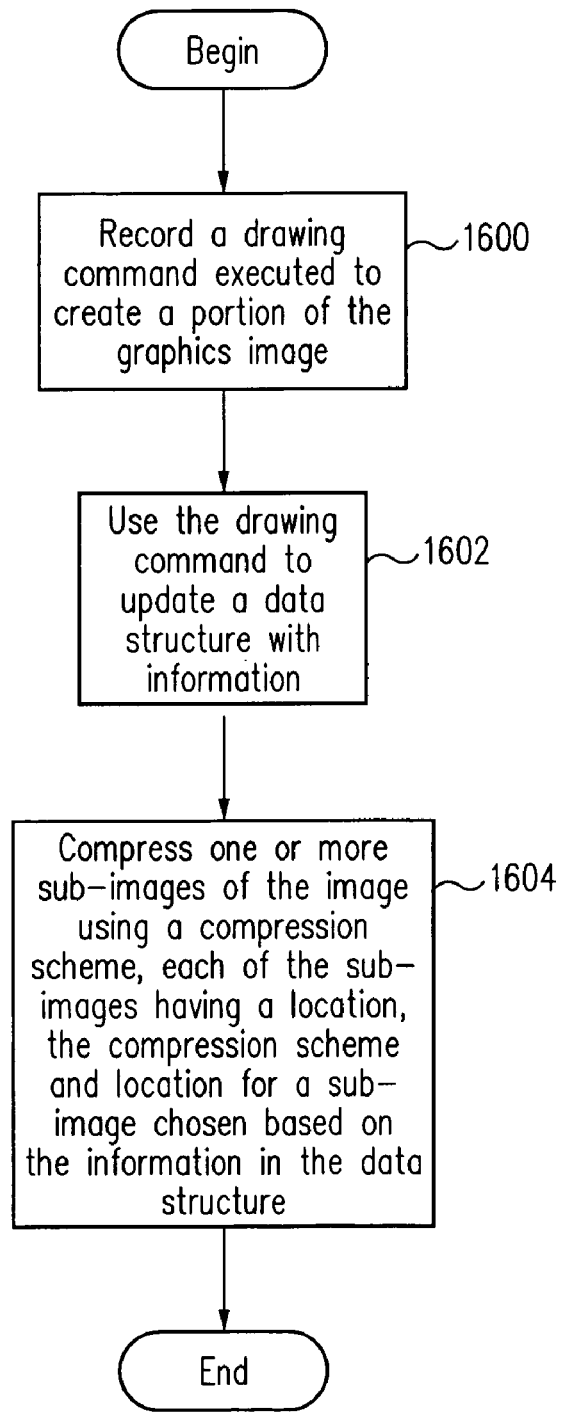
FIG. 16 is a flow diagram illustrating a method for reducing the storage or bandwidth requirements of a graphics image in a computer system in accordance with an embodiment of the present invention.

FIG. 16 is a flow diagram illustrating a method for reducing the storage or bandwidth requirements of a graphics image in a computer system in accordance with an embodiment of the present invention. In this embodiment, a certain class of image data (e.g., text regions) is singled out for special compression, using a compression mode appropriate for the class of image data. A set of one or more drawing commands (e.g. PolyText) may be identified as creating sub-images of this class. Another set of one or more drawing commands (e.g., PutImage) may be identified as overwriting sub-images of this class.

At 1600, a command may be recorded. Command recording may or may not be limited to commands from the two sets of drawing commands identified above. This drawing command may also be one that is executed during the rendering of the graphics image. The graphics image may be created in a tagged drawable. At 1602, the drawing command may be used to update a data structure with information. This may include using information about the region drawn to by the drawing command to update the data structure. This data structure may be associated with the tagged drawable. A private data field, such as a devPrivates field, may be used to attach the data structure to the tagged drawable. While use of the X Windows devPrivates facility would be one method of associating a data structure with the pixmap, there are other possible choices for the method of associating the two.

The information in the data structure may enable determination of what portion of the composite image contains sub-images of the specified image class. One example data structure would be a linked list identifying regions of text. In one embodiment of the present invention, an X region resource may be used to store the region of the tagged drawable which contains sub-images of the specified image class.

At 1604, one or more sub-images from the composite graphics image may be compressed using a compression scheme, with both the location of the sub-images and the compression scheme based on the information in the data structure. It should be noted that the compressor does not necessarily need to know exactly which drawing commands were executed. It only needs to know what sub-images of the image should be compressed with a given compression scheme. It should also be noted that the compression scheme may be as simple as indicating a font, position, color, and text string for a particular region of text. 1604 may occur when the XCopyArea command is used to copy a portion of the off-screen pixmap to a realized window. The compressor may use the information in the data structure to find the location within the composite image of sub-images of the specified image class. The compressor may compress these sub-images using a compression scheme selected for the specified image class. If the region covered by the sub-images is represented as a set of one or more rectangles, as is the case for the X region resource, each rectangle may be compressed and sent independently.

Figure 17:
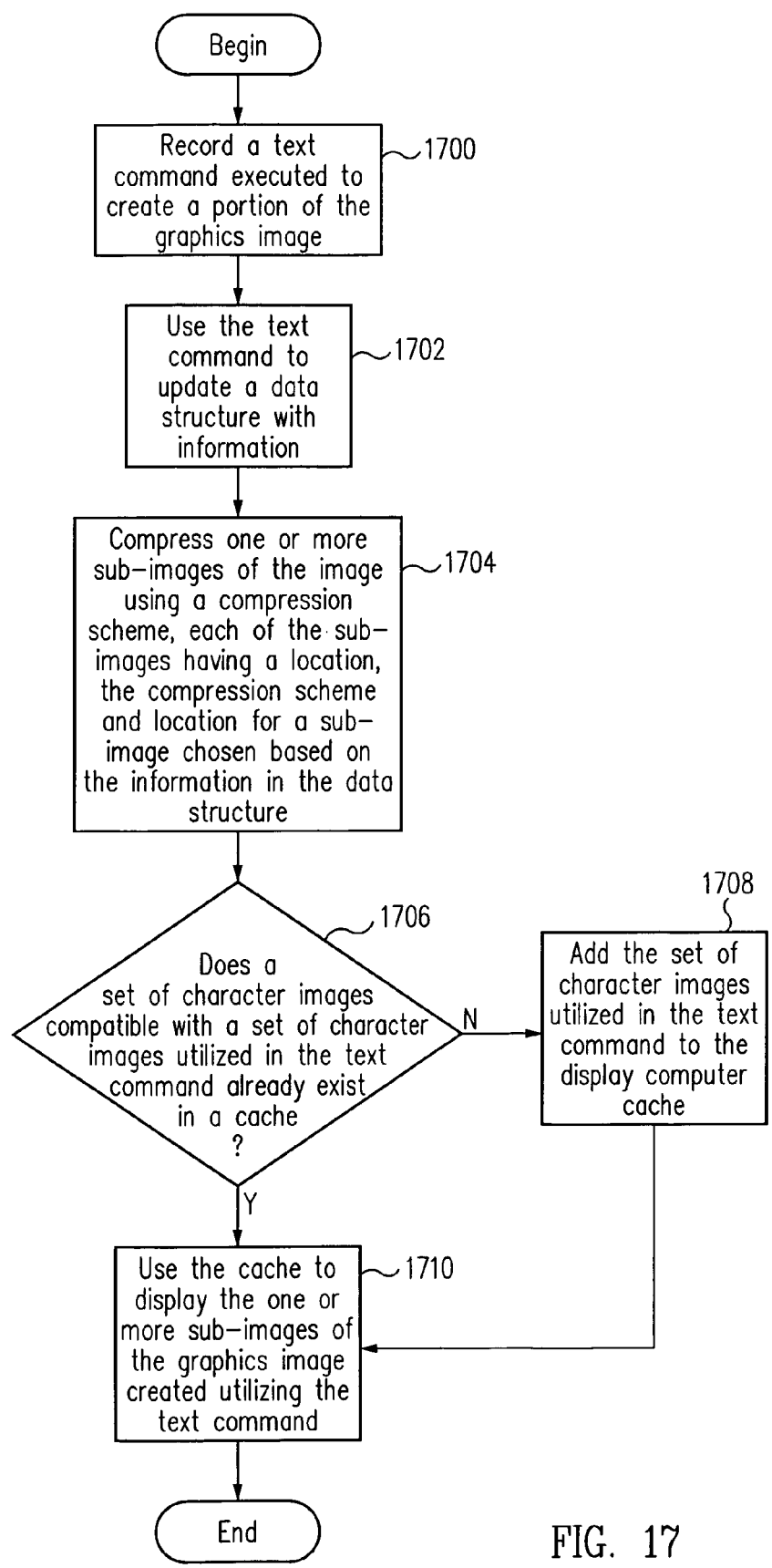
FIG. 17 is a flow diagram illustrating a method for reducing the storage or bandwidth requirements of a graphics image in a computer system in accordance with another embodiment of the present invention.

FIG. 17 is a flow diagram illustrating a method for reducing the storage or bandwidth requirements of a graphics image in a computer system in accordance with another embodiment of the present invention. At 1700, a text command executed to create a portion of the graphics image may be recorded. At 1702, the text command may be used to update a data structure with information. This may include using information about the set of character images and region containing the text to update the data structure. The data structure may be a linked list of X region resources identifying the region or regions that were rendered by one or more text commands, as well as their text strings, fonts, and colors. At 1704, one or more sub-images from the composite graphics image may be compressed using a compression scheme, with both the location of the sub-images and the compression scheme based on the information in the data structure.

At 1706, it may be determined if a set of character images compatible with a set of character images utilized in the text command already exists in a cache. If not, then at 1708, the set of character images utilized in the text command may be added to the display computer cache. This may include determining if there is enough room in the cache on the display computer for the set of character images, removing cache entries until there is enough room in the cache and sending a request to the display computer to remove the cache entries if there is not enough room, sending a request to the display computer to create a new cache entry for the set of character images, and adding the set of character images to the list of sets of character images currently cached on the display computer. The removing of the cache entries may take into account the last time the cache entry was used. At 1710, the set of character images may be used to display the one or more sub-images of the graphics image created utilizing the text command.

Figure 18:
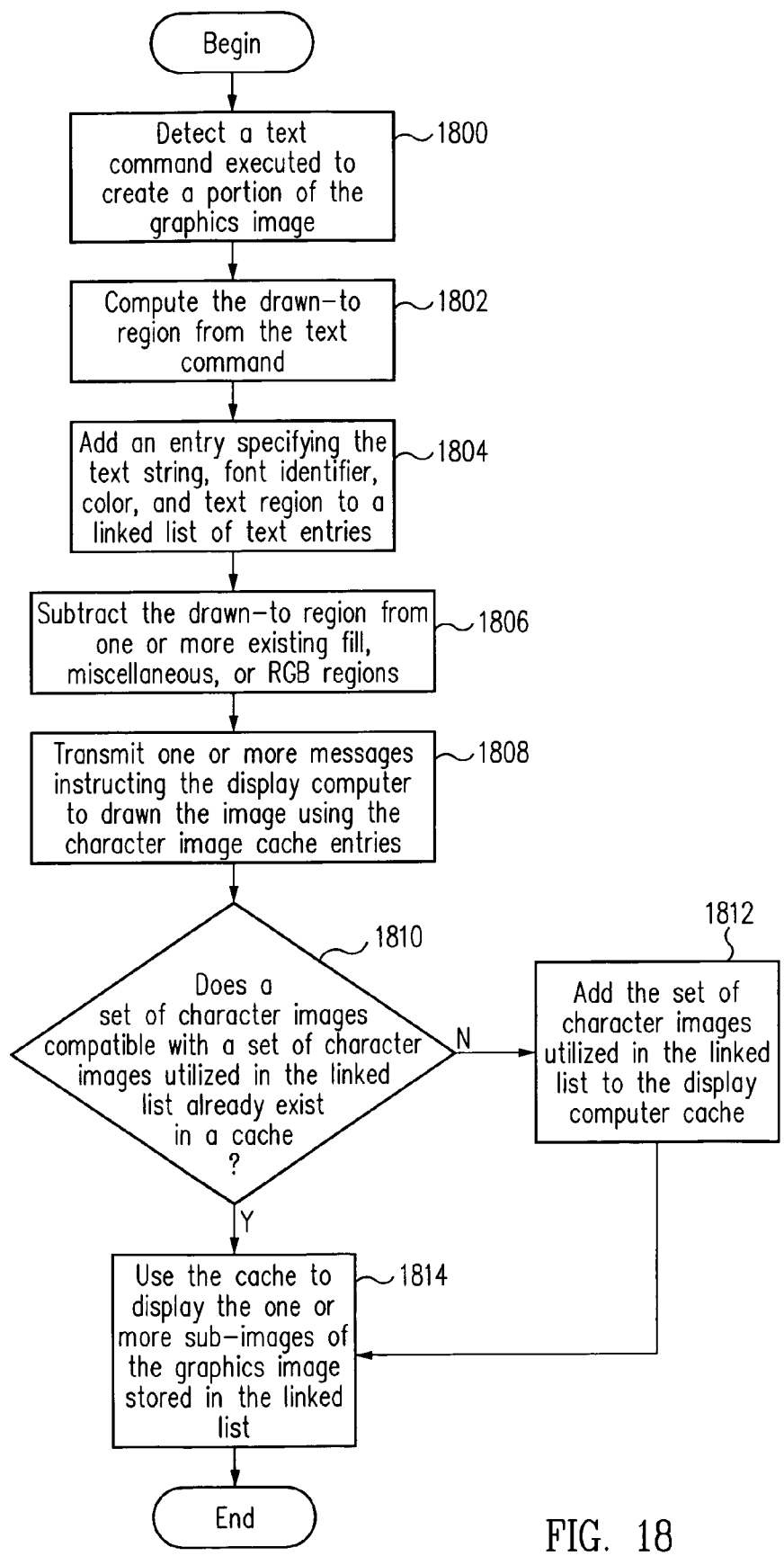
FIG. 18 is a flow diagram illustrating a method for reducing the storage or bandwidth requirements of a graphics image in a computer system in accordance with a third embodiment of the present invention.

FIG. 18 is a flow diagram illustrating a method for reducing the storage or bandwidth requirements of a graphics image in a computer system in accordance with a third embodiment of the present invention. At 1800, a text command executed to created a portion of the graphics image may be detected. At 1802, the drawn-to region may be computed from the text command. At 1804, an entry specifying the text string, font identifier, color, and text region may be added to a linked list of text entries. At 1806, the drawn-to region may be subtracted from one or more existing fill, miscellaneous, or RGB regions. At 1808, one or more messages instructing the display computer to draw the image using the character image cache entries may be transmitted to the display computer. 1808 may occur when the XCopyArea command is used to copy a portion of the off-screen pixmap to a realized window. At 1810, it may be determined if a set of character images compatible with a set of character images utilized in the linked list already exists in a cache. If not, then at 1812, the set of character images utilized in the linked list may be added to the display computer cache. This may include determining if there is enough room in the cache on the display computer for the set of character images, removing cache entries until there is enough room in the cache and sending a request to the display computer to remove the cache entries if there is not enough room, sending a request to the display computer to create a new cache entry for the set of character images, and adding the set of character images to the list of sets of character images currently cached on the display computer. The removing of the cache entries may take into account the last time the cache entry was used. At 1814, the set of character images may be used to display the one or more sub-images of the graphics image stored in the linked list.

Figure 19:
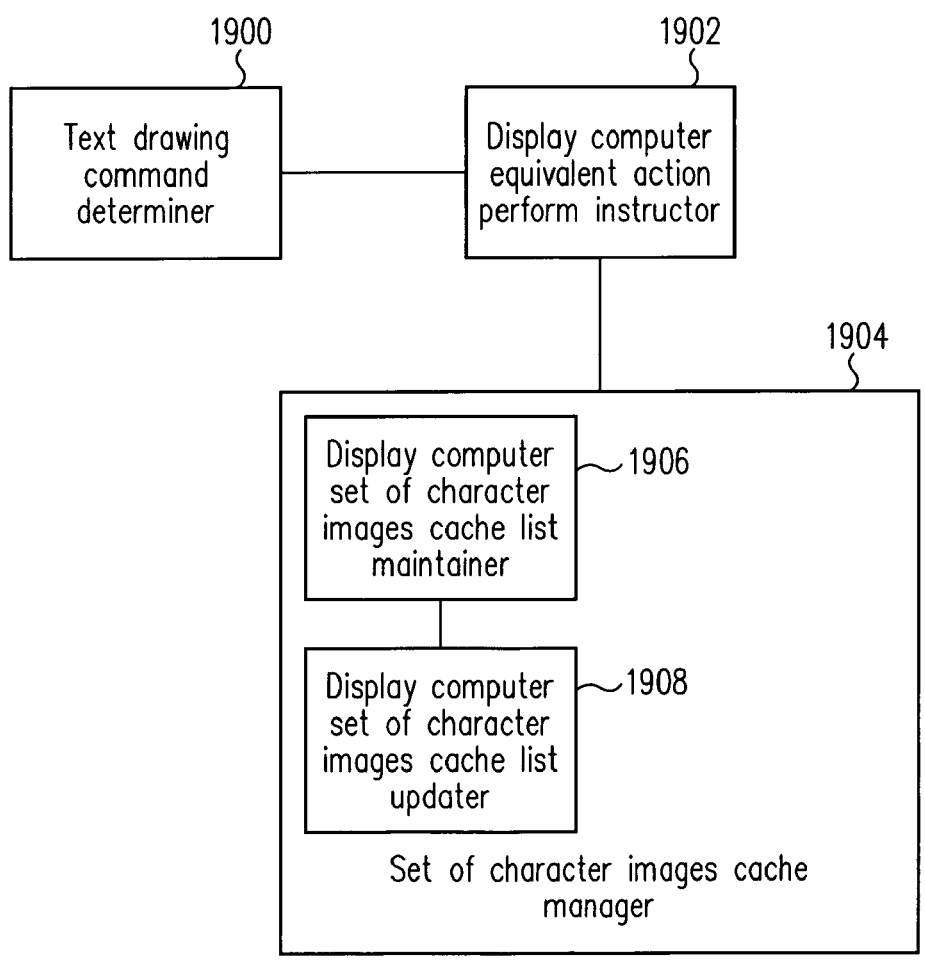
FIG. 19 is a block diagram illustrating an apparatus for processing a drawing command in a computer system having a host computer and a display computer in accordance with an embodiment of the present invention.

FIG. 19 is a block diagram illustrating an apparatus for processing a drawing command in a computer system having a host computer and a display computer in accordance with an embodiment of the present invention. A text drawing command determiner 1900 may determine if the drawing command draws text to the screen. A display computer equivalent action perform instructor 1902 coupled to the text drawing command determiner 1900 may instruct the display computer to perform an equivalent action to the drawing command using a cache of one or more sets of one or more character images if the drawing command draws to the screen. A set of character images cache manager 1904 coupled to the display computer equivalent action perform instructor 1902 may manage the cache of one or more sets of one or more character images from the host computer. This may include maintaining, on the host computer, a list of sets of character images currently cached on the display computer with a display computer set of character images cache list maintainer 1906, and updating the list as needed in response to the drawing command with a display computer set of character images cache list updater 1908 coupled to a display computer set of character images cache list maintainer 1906.

Figure 20:
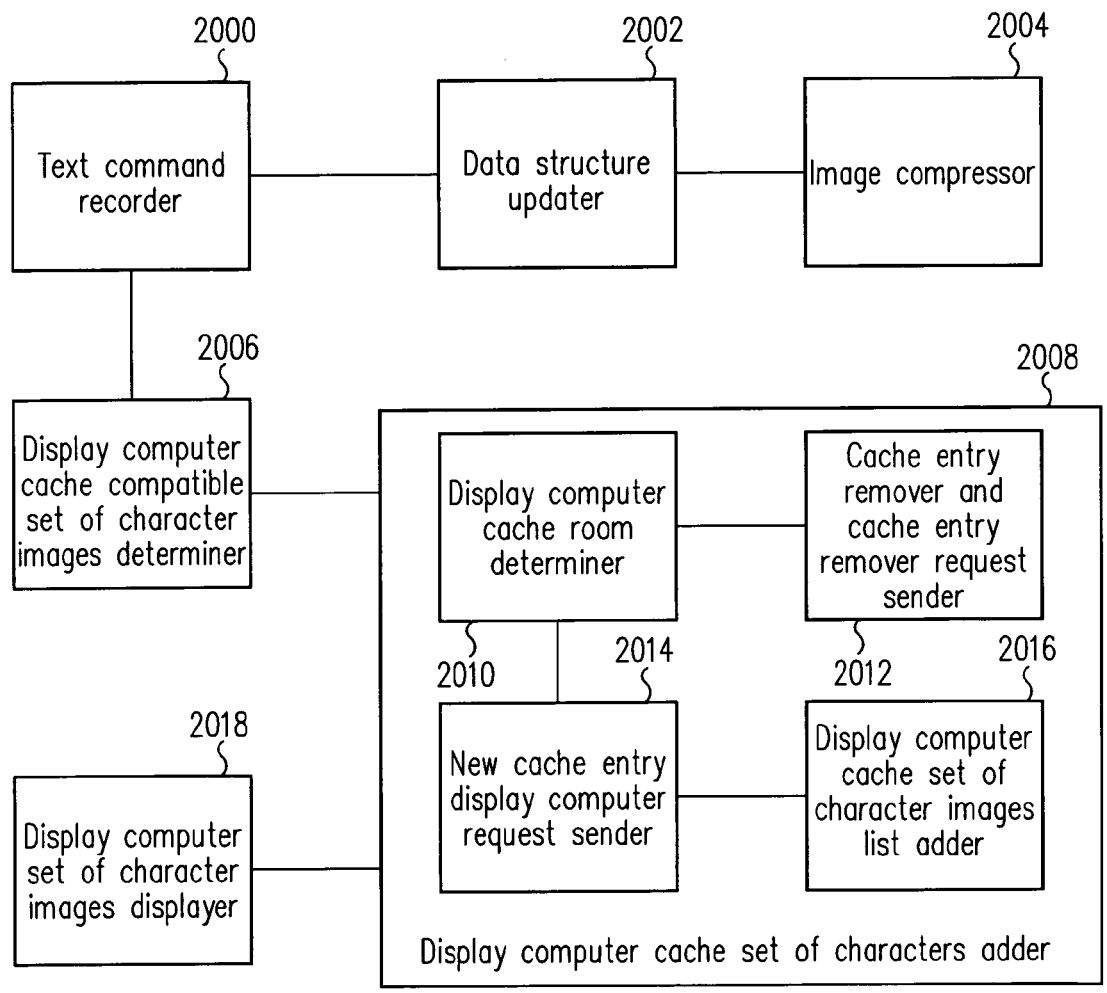
FIG. 20 is a block diagram illustrating an apparatus for reducing the storage or bandwidth requirements of a graphics image in a computer system in accordance with an embodiment of the present invention.

FIG. 20 is a block diagram illustrating an apparatus for reducing the storage or bandwidth requirements of a graphics image in a computer system in accordance with an embodiment of the present invention. A text command recorder 2000 may record a text command executed to create a portion of the graphics image. A data structure updater 2002 coupled to the text command recorder 2000 may use the text command to update a data structure with information. This may include using information about the set of character images and region containing the text to update the data structure. The data structure may be a linked list of X region resources identifying the region or regions that were rendered by one or more text commands, as well as their text strings, fonts, and colors. An image compressor 2004 coupled to the data structure updater 2002 may compress one or more sub-images from the composite graphics image using a compression scheme, with both the location of the sub-images and the compression scheme based on the information in the data structure.

A display computer cache compatible set of character images determiner 2006 coupled to the text command recorder 2000 may determine if a set of character images compatible with a set of character images utilized in the text command already exists in a cache. If not, then a display computer cache set of character images adder 2008 coupled to the display computer cache compatible set of character images determiner 2006 may add the set of character images utilized in the text command may to the display computer cache. This may include determining if there is enough room in the cache on the display computer for the set of character images using a display computer cache room determiner 2010, removing cache entries until there is enough room in the cache and sending a request to the display computer to remove the cache entries using a cache entry remover and cache entry remover request sender 2012 coupled to the display computer cache room determiner 2010 if there is not enough room, sending a request to the display computer to create a new cache entry for the set of character images using a new cache entry display computer request sender 2014 coupled to the display computer cache room determiner 2010, and adding the set of character images to the list of sets of character images currently cached on the display computer using a display computer cache set of character images list adder 2016 coupled to the new cache entry display computer request sender 2014. The removing of the cache entries may take into account the last time the cache entry was used. A display computer set of character images displayer 2018 coupled to the display computer cache set of character images adder 2008 may use the set of character images to display the one or more sub-images of the graphics image created utilizing the text command.

Figure 21:
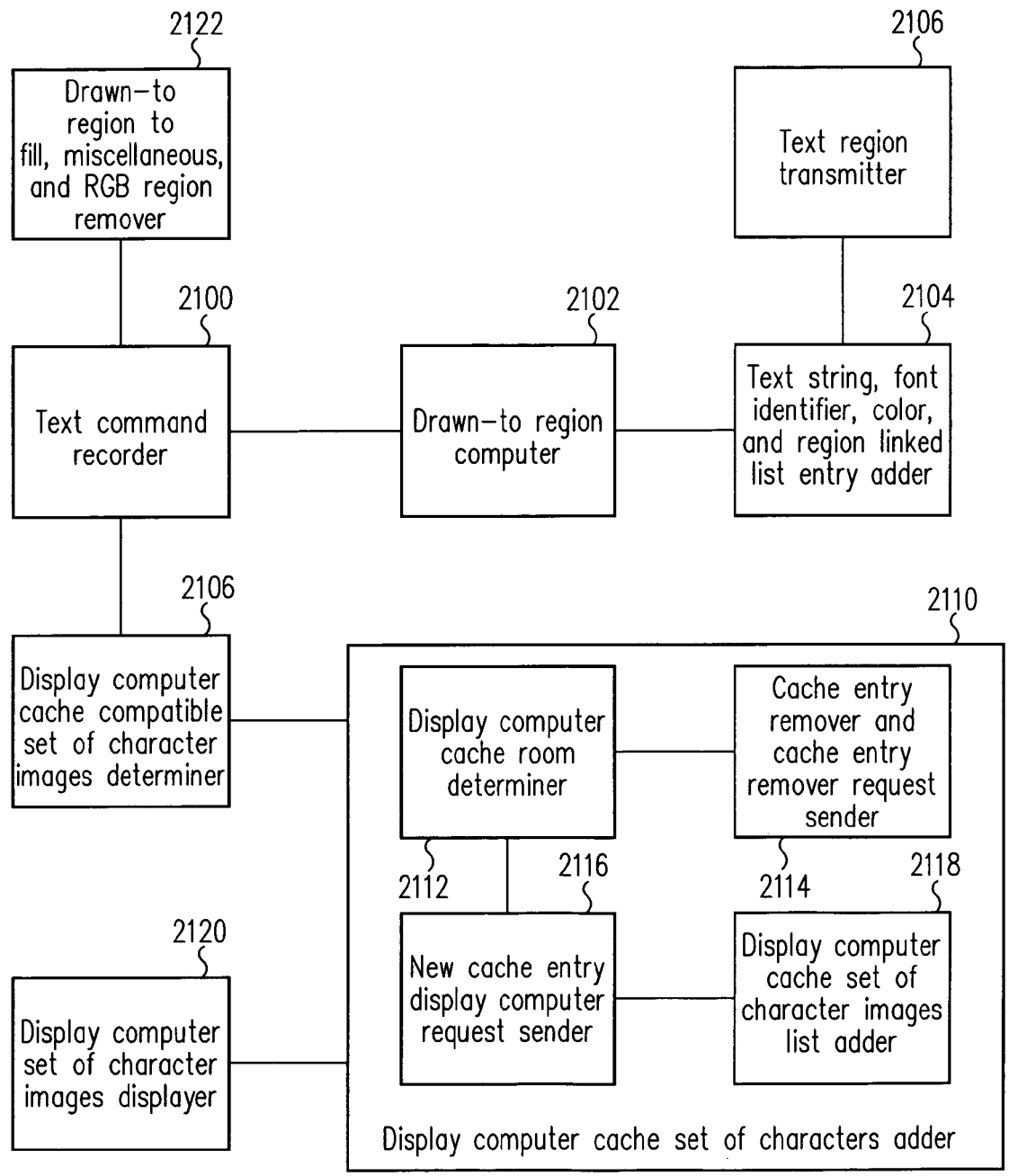
FIG. 21 is a block diagram illustrating an apparatus for reducing the storage or bandwidth requirements of a graphics image in a computer system in accordance with another embodiment of the present invention.

FIG. 21 is a block diagram illustrating an apparatus for reducing the storage or bandwidth requirements of a graphics image in a computer system in accordance with another embodiment of the present invention. A text command detector 2100 may detect a text command executed to created a portion of the graphics image. A drawn-to region computer 2102 coupled to the text command detector 2100 may compute the drawn-to region from the text command. A text string, font identifier, color, and region linked list entry adder 2104 coupled to the drawn-to region computer 2102 may add an entry specifying the text string, font identifier, color, and text region to a linked list of text entries. A text region transmitter 2106 coupled to the text string, font identifier, color, and region linked list entry adder 2104 may transmit one or more messages instructing the display computer to draw the image using the character image cache entries. A display computer cache compatible set of character images determiner 2108 coupled to the text command detector 2100 may determine if a set of character images compatible with a set of character images utilized in the text command already exists in a cache. If not, then a display computer cache set of character images adder 2110 coupled to the display computer cache compatible set of character images determiner 2108 may add the set of character images utilized in the text command may to the display computer cache. This may include determining if there is enough room in the cache on the display computer for the set of character images using a display computer cache room determiner 2112, removing cache entries until there is enough room in the cache and sending one or more requests to the display computer to remove the cache entries using a cache entry remover and cache entry remover request sender 2114 coupled to the display computer cache room determiner 2112, sending a request to the display computer to create a new cache entry for the set of character images using a new cache entry display computer request sender 2116 coupled to the display computer cache room determiner 2112, and adding the set of character images to the list of sets of character images currently cached on the display computer using a display computer cache set of character images list adder 2118 coupled to the new cache entry display computer request sender 2116. The removing of the cache entries may take into account the last time the cache entry was used. A display computer set of character images displayer 2120 coupled to the display computer cache set of character images adder 2110 may use the set of character images to display the one or more sub-images of the graphics image created utilizing the text command. A drawn-to region to fill, miscellaneous, and RGB region remover 2122 coupled to the text command detector 2100 may subtract the drawn-to region from one or more existing fill, miscellaneous, or RGB regions.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for reducing the storage or bandwidth requirements of a graphics image or reducing CPU usage in a computer system, the method comprising:
   recording a text command executed to create a portion of the graphics image;
   using said text command to update a data structure with information;
   compressing one or more sub-images of the graphics image using a compression scheme, each of said sub-images having a location, said location and said compression scheme for each of said sub-images chosen based on said information in said data structure, wherein;
   said data structure identifies the portion of the graphics image that was created with a specific drawing command, further wherein;
   said data structure includes a list specifying text regions, text strings, character set identifiers, and/or colors;
   determining if a set of character images compatible with a set of character images utilized in the text command already exists in a cache;
   adding the set of character images utilized in the text command to a display computer cache if the set of character images utilized in the text command does not already exist in a cache; and
   utilizing said set of character images to display said one or more sub-images of the graphics image created using the text command, wherein said adding the set of character images utilized in the text command includes:
   determining if there is enough room in said cache on said display computer for the set of character images;
   removing cache entries until there is enough room in said cache, if there is not enough room in said cache on said display computer for the set of character images;
   sending a request to said display computer to create one or more new cache entries for the set of character images; and
   adding the set of character images to a list of sets of character images currently cached on said display computer.

2. The method of claim 1, where said removing cache entries includes taking into account the last time the cache entry was used.

3. The method of claim 1, wherein said removing cache entries includes:
   removing one or more cache entries from a list of cache entries on a host computer; and
   sending one or more requests to said display computer to remove said cache entries.

4. An apparatus for reducing the storage or bandwidth requirements of a graphics image or reducing CPU usage in a computer system, comprising:
   a text command recorder;
   a data structure updater coupled to said text command recorder;
   an image compressor coupled to said data structure updater, said image compressor for compressing one or more sub-images of the graphics image using a compression scheme, said compression scheme for each of said sub-images chosen based on said information in said data structure;
   a display computer cache compatible set of character images determiner coupled to said text command recorder;
   a display computer cache set of character images adder coupled to said display computer cache compatible set of character images determiner; and
   a display computer set of character images displayer coupled to said display computer cache set of character images adder, wherein said display computer cache set of character images adder includes:
   a display computer cache room determiner;
   a cache entry remover and cache entry remover request sender coupled to said display computer cache room determiner;
   a new cache entry display computer request sender coupled to said display computer cache room determiner; and
   a display computer cache set of character images list adder coupled to said new cache entry display computer request sender.

5. An apparatus for reducing the storage or bandwidth requirements of a graphics image or reducing CPU usage in a computer system, the apparatus comprising:
   means for recording a text command executed to create a portion of the graphics image;

means for using said text command to update a data structure with information;

means for compressing one or more sub-images of the graphics image using a compression scheme, each of said sub-images having a location, said location and said compression scheme for each of said sub-images chosen based on said information in said data structure, wherein;

said data structure identifies the portion of the graphics image that was created with a specific drawing command, further wherein;

said data structure includes a list specifying text regions, text strings, character set identifiers, and/or colors;

means for determining if a set of character images compatible with a set of character images utilized in the text command already exists in a cache;

means for adding the set of character images utilized in the text command to a display computer cache if the set of character images utilized in the text command does not already exist in a cache; and means for utilizing said set of character images to display said one or more sub-images of the graphics image created using the text command, wherein said means for adding the set of character images utilized in the text command includes:

means for determining if there is enough room in said cache on said display computer for the set of character images;

means for removing cache entries until there is enough room in said cache and sending one or more requests to said display computer to remove said cache entries, if there is not enough room in said cache on display computer for the set of character images;

means for sending a request to said display computer to create a new cache entry for the set of character images; and means for adding the set of character images to a list of sets of character images currently cached on said display computer.

6. The apparatus of claim 5, where said means for removing cache entries includes means for taking into account the last time the cache entry was used.

* * * * *